US011237769B2

United States Patent
Kanno

(10) Patent No.: US 11,237,769 B2
(45) Date of Patent: Feb. 1, 2022

(54) MEMORY SYSTEM AND METHOD OF CONTROLLING NONVOLATILE MEMORY

(71) Applicant: Kioxia Corporation, Tokyo (JP)

(72) Inventor: Shinichi Kanno, Ota (JP)

(73) Assignee: Kioxia Corporation, Tokyo (JP)

( * ) Notice: Subject to any disclaimer, the term of this patent is extended or adjusted under 35 U.S.C. 154(b) by 0 days.

(21) Appl. No.: 17/018,224

(22) Filed: Sep. 11, 2020

(65) Prior Publication Data

US 2021/0255803 A1 Aug. 19, 2021

(30) Foreign Application Priority Data

Feb. 14, 2020 (JP) .............................. JP2020-023249

(51) Int. Cl.
*G06F 3/06* (2006.01)

(52) U.S. Cl.
CPC .......... *G06F 3/0659* (2013.01); *G06F 3/0604* (2013.01); *G06F 3/0619* (2013.01); *G06F 3/0631* (2013.01); *G06F 3/0644* (2013.01); *G06F 3/0652* (2013.01); *G06F 3/0656* (2013.01); *G06F 3/0679* (2013.01)

(58) Field of Classification Search
CPC .... G06F 3/0659; G06F 3/0631; G06F 3/0652; G06F 3/0679; G06F 3/0656
USPC ....................................................... 711/154
See application file for complete search history.

(56) References Cited

U.S. PATENT DOCUMENTS

| 9,811,462 | B2 | 11/2017 | Kanno | |
|---|---|---|---|---|
| 9,830,079 | B2 | 11/2017 | Kanno | |
| 2002/0051394 | A1* | 5/2002 | Tobita | G06F 3/0616 365/221 |
| 2010/0049913 | A1* | 2/2010 | Marcu | G06F 3/0659 711/114 |
| 2012/0265925 | A1* | 10/2012 | Miura | G06F 12/0246 711/103 |
| 2018/0088805 | A1 | 3/2018 | Kanno | |
| 2018/0314444 | A1* | 11/2018 | Jinzenji | G06F 3/0679 |
| 2019/0332316 | A1 | 10/2019 | Kanno et al. | |

FOREIGN PATENT DOCUMENTS

| JP | 2018-181374 A | 11/2018 |
|---|---|---|
| JP | 2019-179571 A | 10/2019 |
| JP | 2019-191909 A | 10/2019 |

* cited by examiner

*Primary Examiner* — Than Nguyen
(74) *Attorney, Agent, or Firm* — Oblon, McClelland, Maier & Neustadt, L.L.P.

(57) ABSTRACT

According to one embodiment, a controller of a memory system executes a first write operation of writing write data into a first storage region, in response to reception of one or more write requests for specifying a first zone from a host, during a period from execution of an erase operation of the first storage region until a first time elapses. When the first time has elapsed after execution of the erase operation, in a state in which an unwritten region having a size larger than or equal to a first size remains in the first storage region, the controller does not execute the first write operation, allocates the first storage region as a nonvolatile buffer capable of temporarily storing write data to be written to each of a plurality of zones.

12 Claims, 18 Drawing Sheets

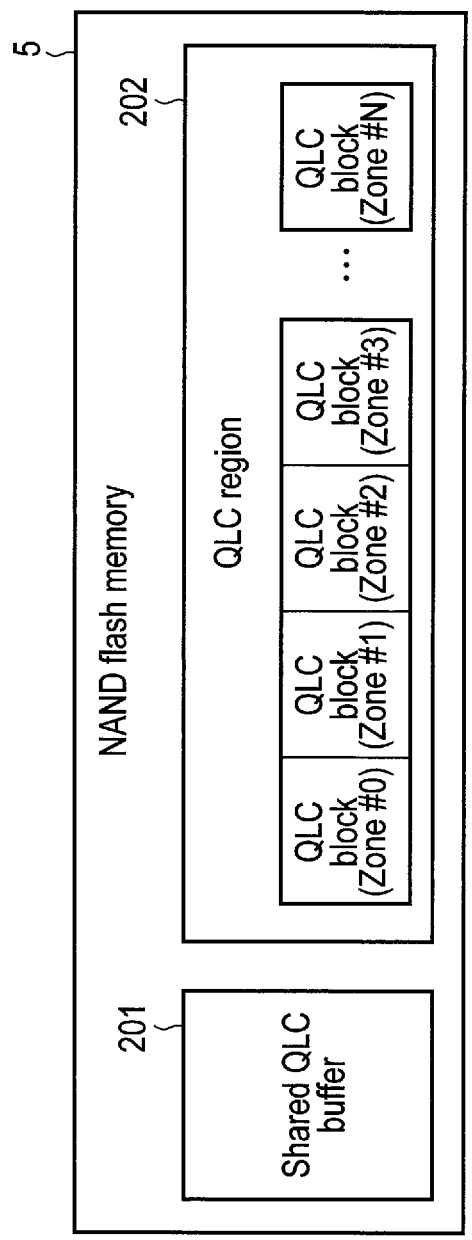
F I G. 3

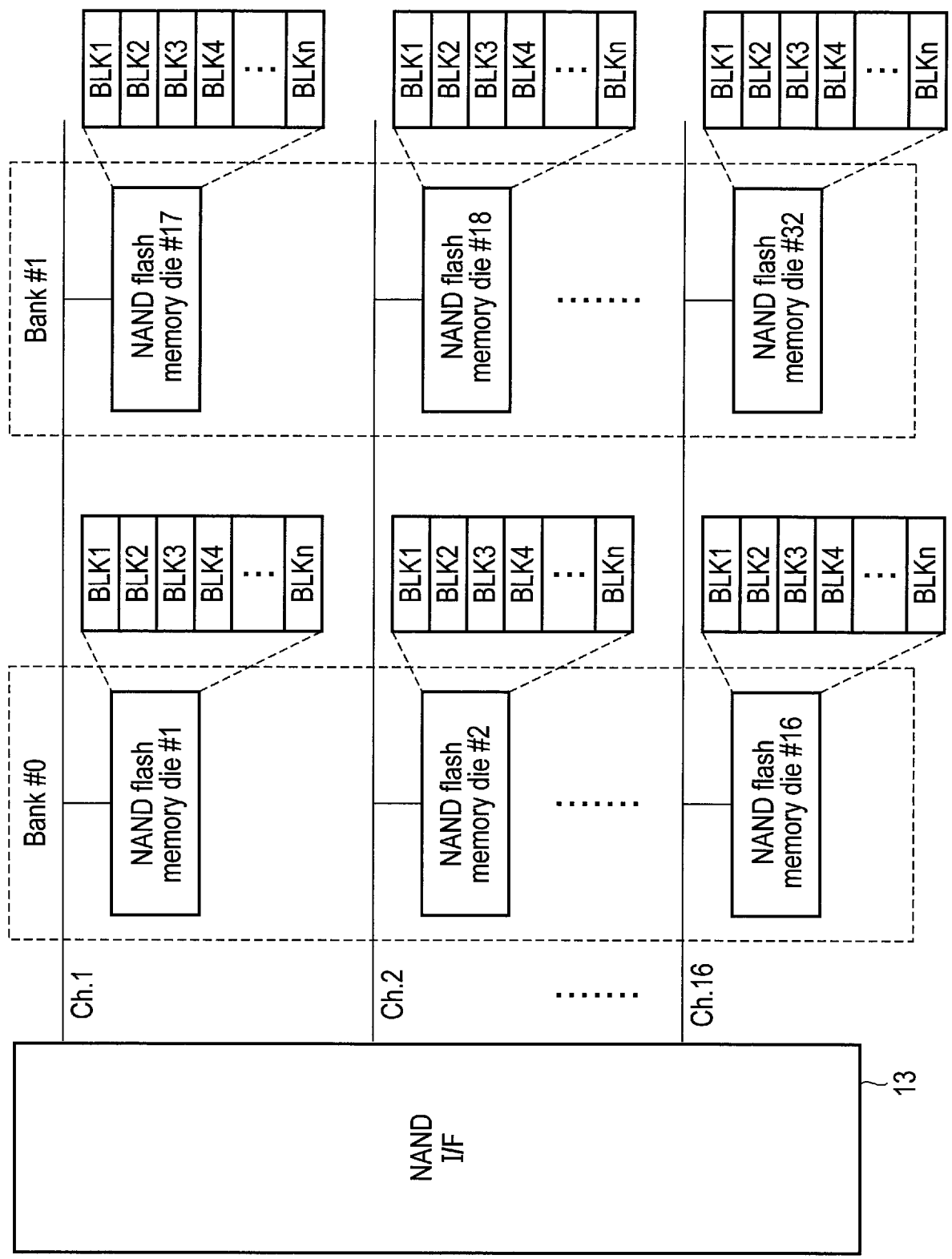
F I G. 6

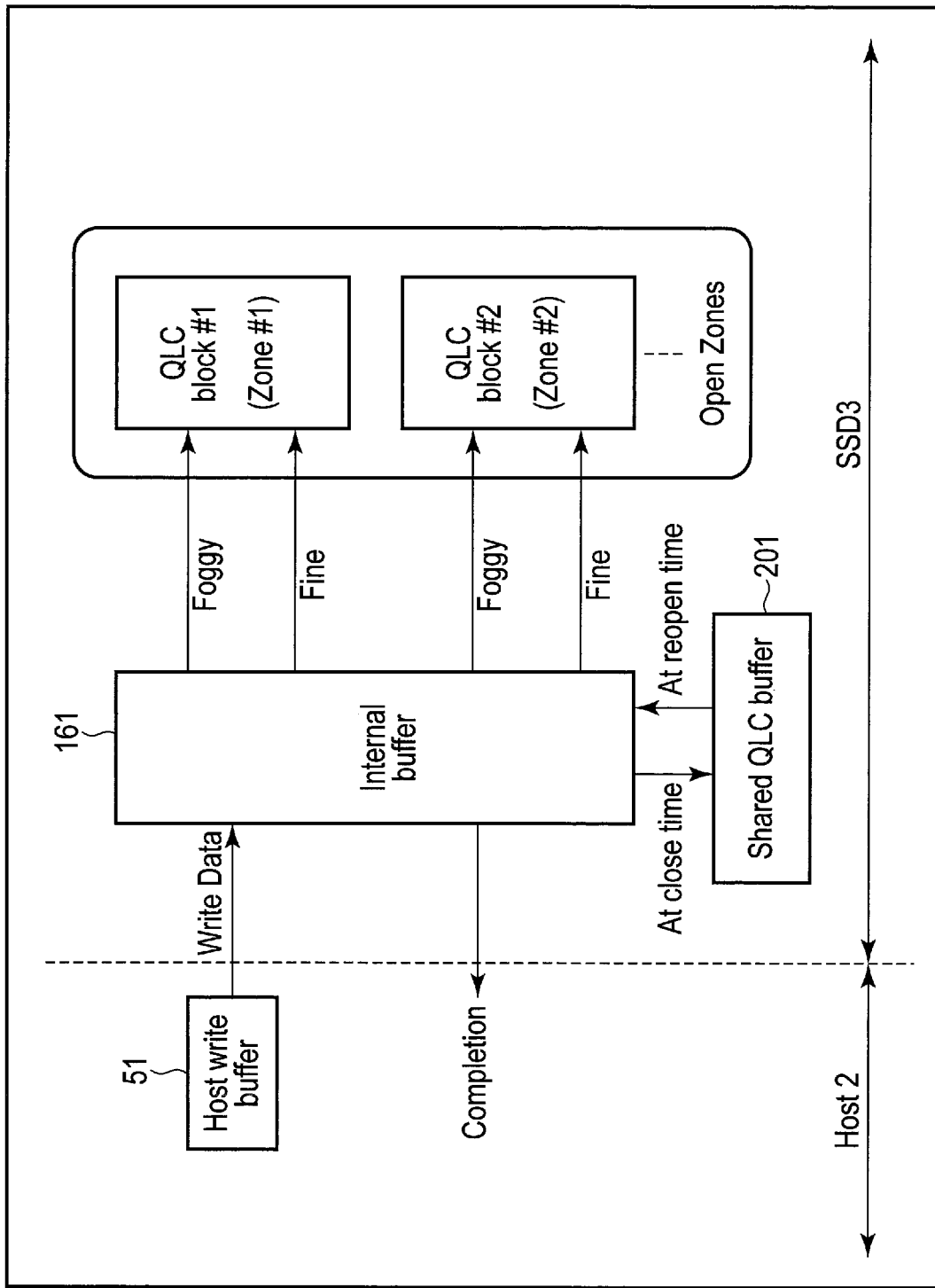
F I G. 9

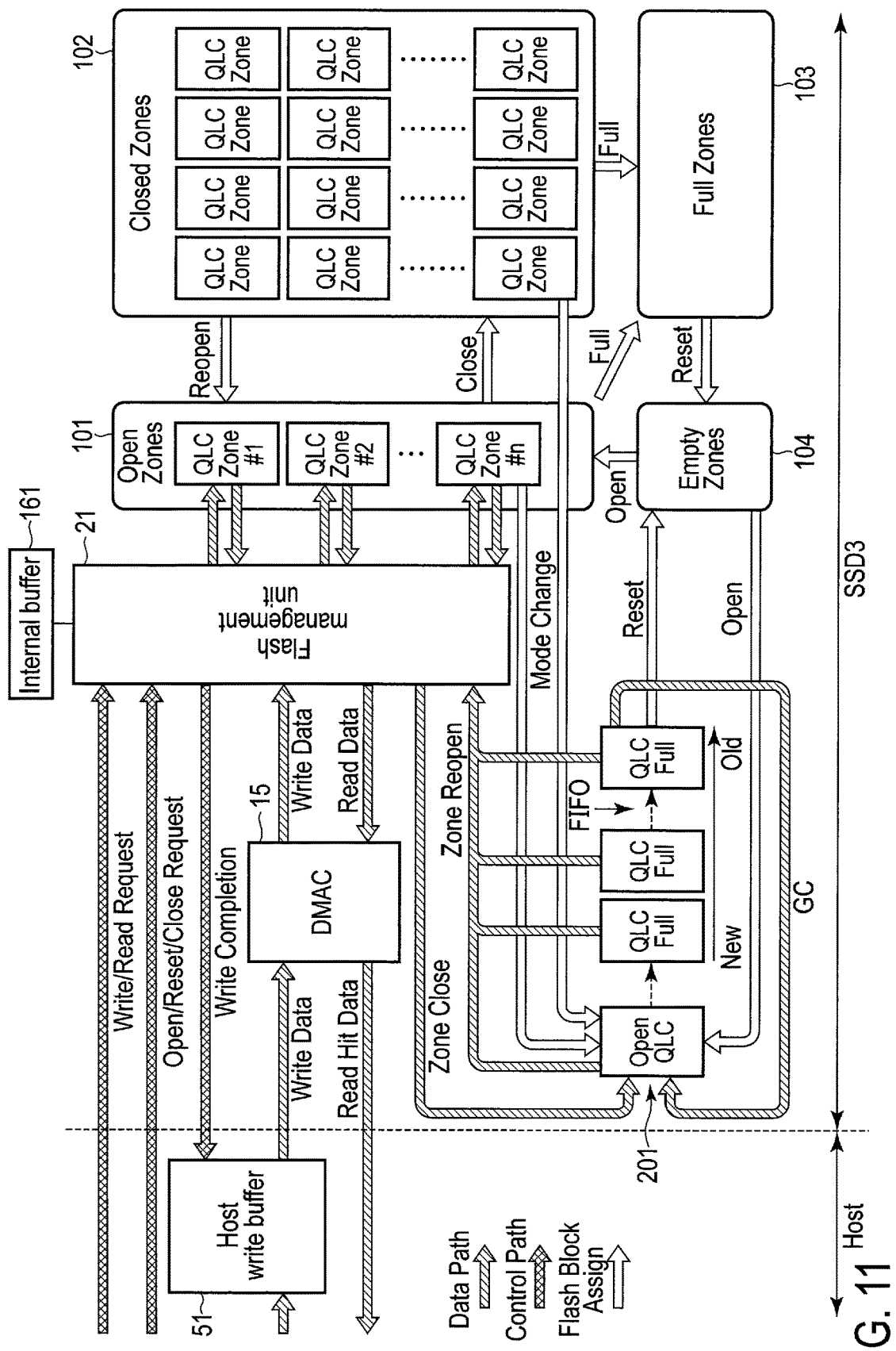
F I G. 11

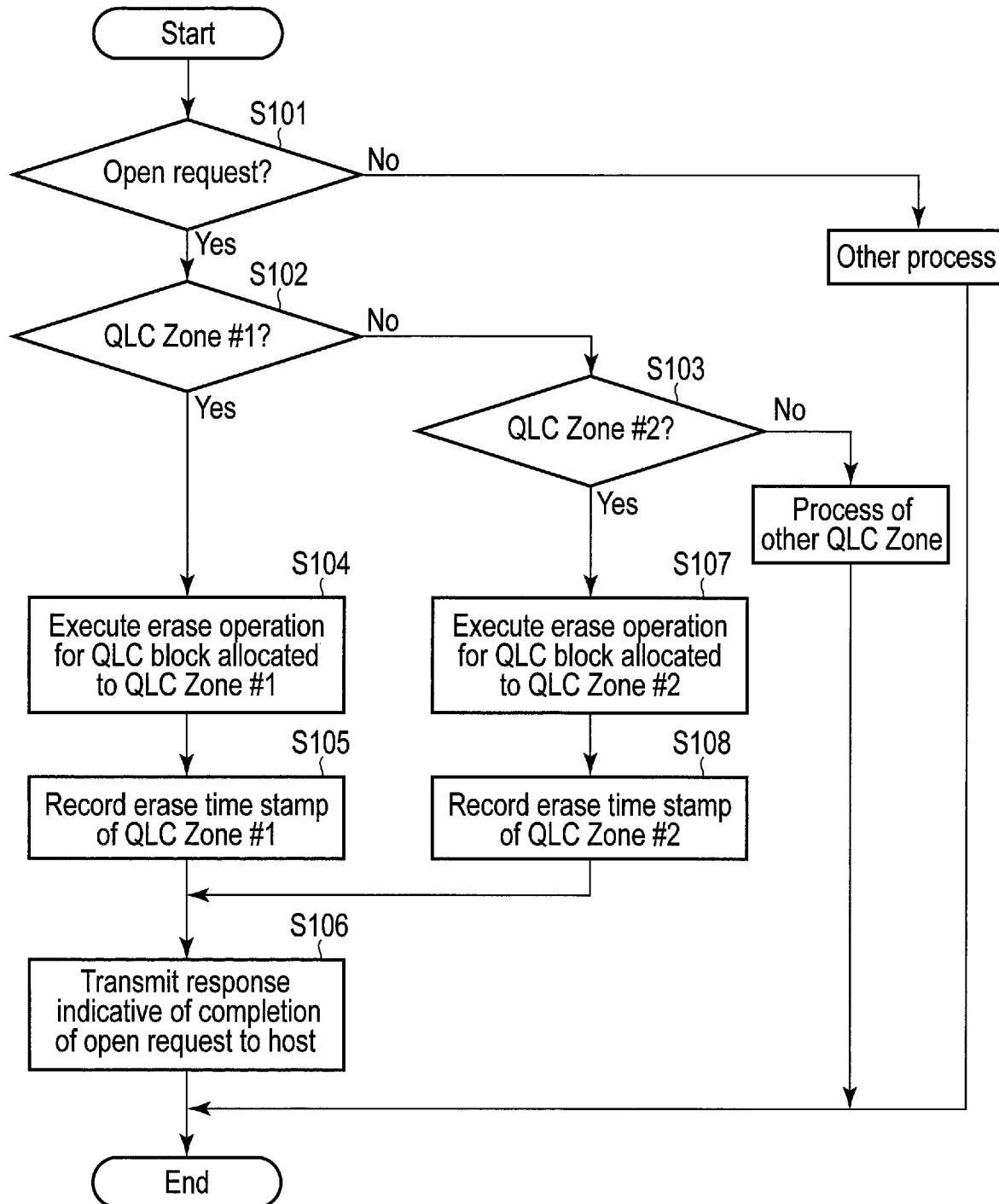
F I G. 12

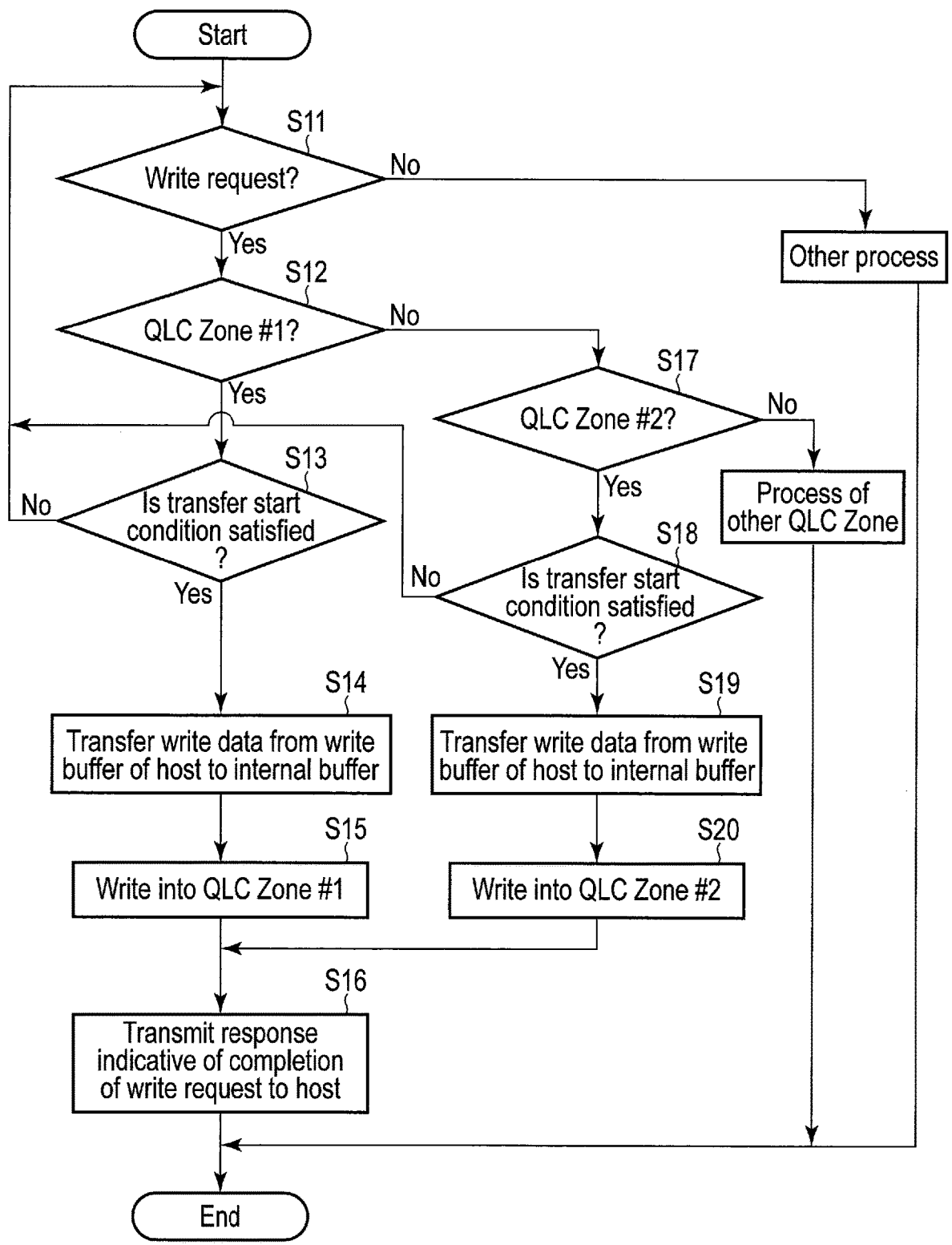
F I G. 13

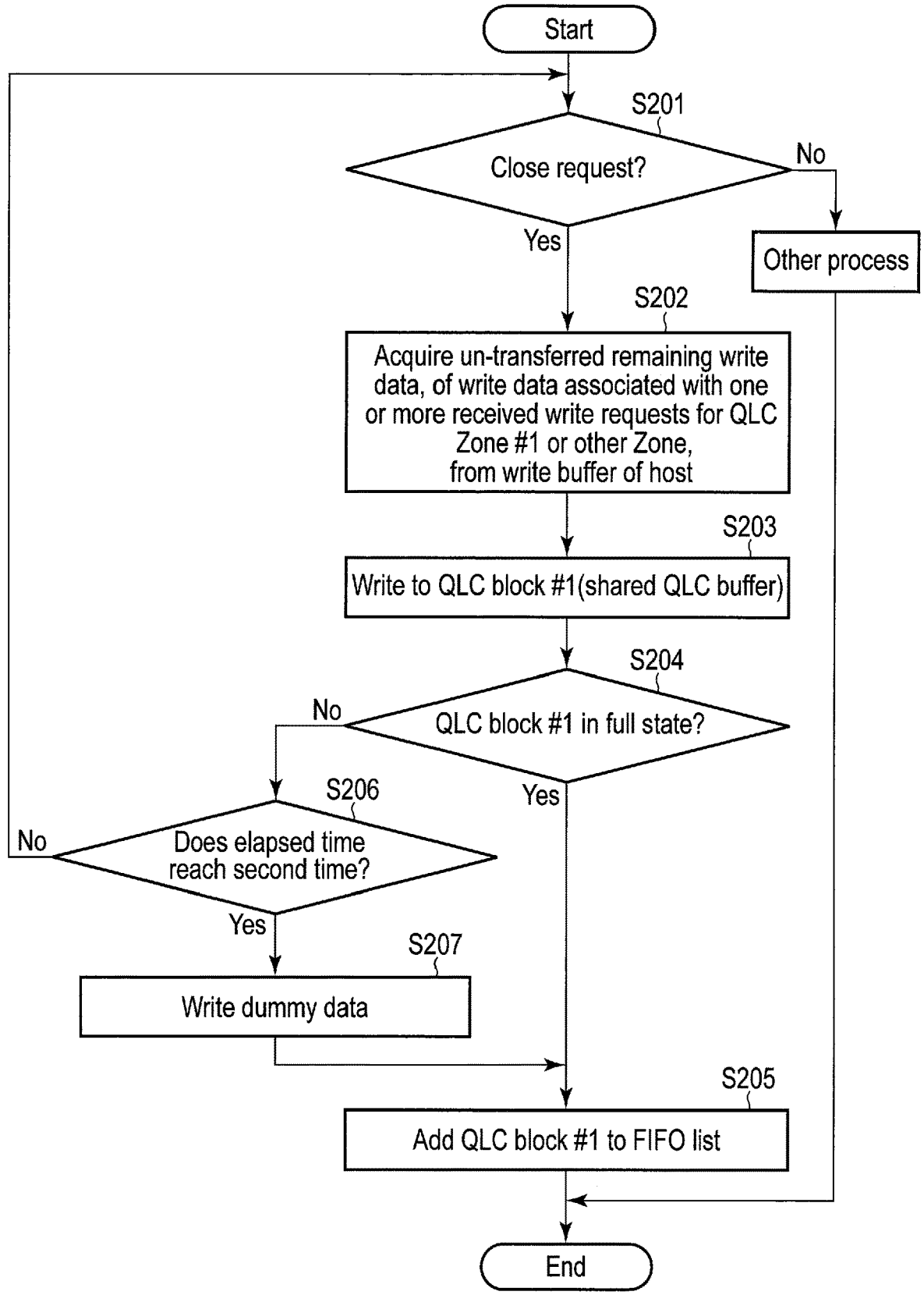
F I G. 17

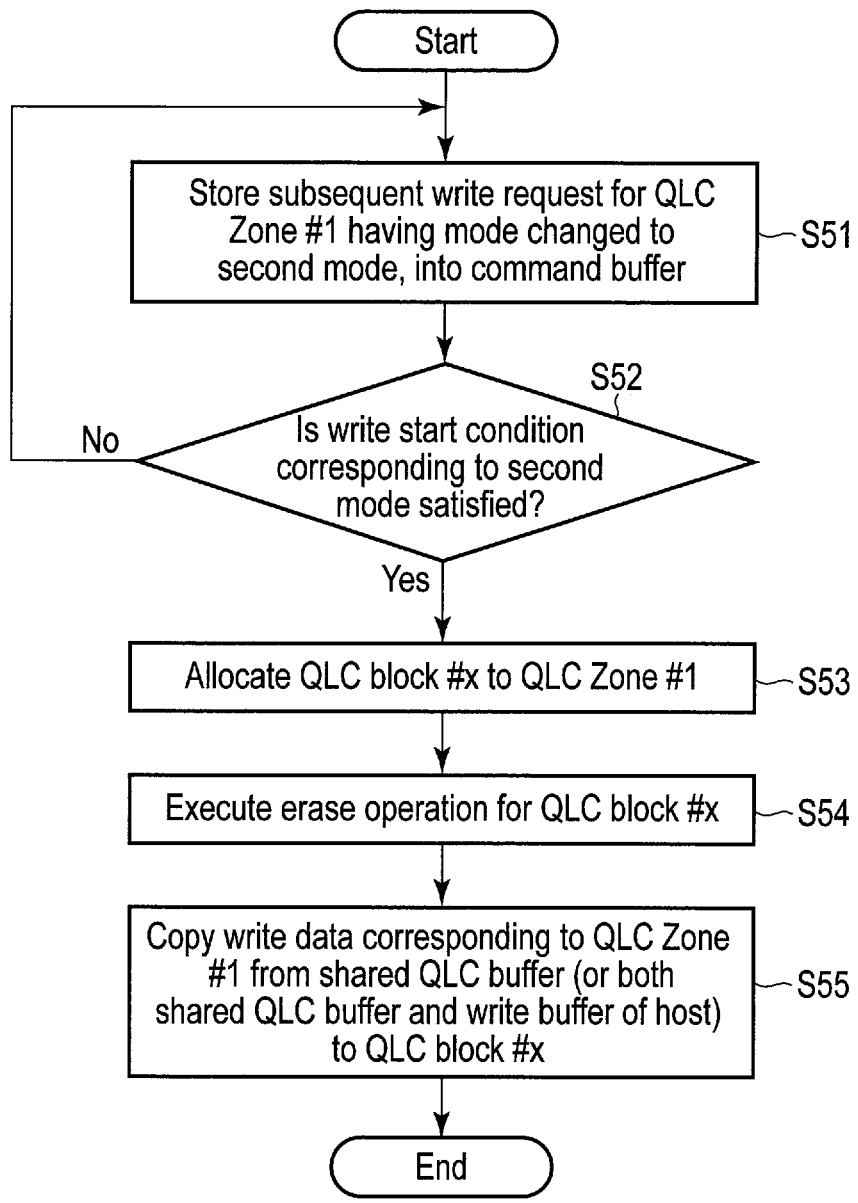
F I G. 18

MEMORY SYSTEM AND METHOD OF CONTROLLING NONVOLATILE MEMORY

CROSS-REFERENCE TO RELATED APPLICATIONS

This application is based upon and claims the benefit of priority from Japanese Patent Application No. 2020-023249, filed Feb. 14, 2020, the entire contents of which are incorporated herein by reference.

FIELD

Embodiments described herein relate generally to a technology of controlling a nonvolatile memory.

BACKGROUND

In recent years, memory systems including nonvolatile memories have been widely prevalent. As such the memory systems, a solid state drive (SSD) including a NAND flash memory is known.

The memory systems such as the SSD are used as storage devices of various host computing systems such a server in a data center.

In the memory systems such as the SSD, implementation of a new technique of efficiently using storage regions of the nonvolatile memories is required.

BRIEF DESCRIPTION OF THE DRAWINGS

FIG. 3 is a block diagram illustrating a relationship between a plurality of quad-level cell blocks (QLC blocks) used as user data storage regions and a plurality of shared QLC blocks shared by the plurality of QLC blocks.

FIG. 6 is a block diagram illustrating a relationship between a plurality of channels and a plurality of NAND flash memory dies, which are used in the memory system according to the embodiment.

FIG. 9 is a diagram illustrating an operation of controlling zones and the shared QLC buffer, which is executed in the memory system according to the embodiment.

FIG. 11 is a block diagram illustrating an example of a sequence of the write operation and a sequence of a read operation, which are executed in the memory system according to the embodiment.

FIG. 12 is a flowchart illustrating a procedure of a zone open operation executed in the memory system according to the embodiment.

FIG. 13 is a flowchart illustrating a procedure of the write operation executed in the memory system according to the embodiment.

FIG. 17 is a flowchart illustrating a procedure of the zone close operation executed in the second mode.

FIG. 18 is a flowchart illustrating a procedure of a copy operation executed in the second mode.

DETAILED DESCRIPTION

Various embodiments will be described hereinafter with reference to the accompanying drawings.

In general, according to one embodiment, a memory system connectable to a host comprises a nonvolatile memory, and a controller electrically connected to the nonvolatile memory and configured to allocate one storage region of a plurality of storage regions included in the nonvolatile memory to each of a plurality of zones to which a plurality of logical address ranges obtained by dividing a logical address space for accessing the memory system are allocated, respectively.

The controller executes an erase operation for a first storage region allocated to a first zone of the plurality of zones. During a period from the execution of the erase operation of the first storage region and until a first time elapses, in response to receiving one or more write requests for specifying the first zone from the host, the controller executes a first write operation including both an operation of transferring write data associated with a set of the one or more write requests from a write buffer of the host to an internal buffer of the memory system and an operation of writing the write data transferred to the internal buffer into the first storage region.

When the first time has elapsed after the execution of the erase operation, in a state in which an unwritten region having a size larger than or equal to a first size remains in the first storage region, the controller does not execute the first write operation, allocates the first storage region as a nonvolatile buffer capable of temporarily storing write data to be written to each of the plurality of zones.

In response to receiving from the host a first request for causing the state of the first zone or another zone to transition to a state in which writing is suspended, the controller acquires from the write buffer of the host remaining write data of write data associated with one or more received write requests for specifying the first zone or the other zone, the remaining write data being data un-transferred to the internal buffer, and writes the acquired remaining write data into the unwritten region of the first storage region allocated as the nonvolatile buffer.

Figure 1:
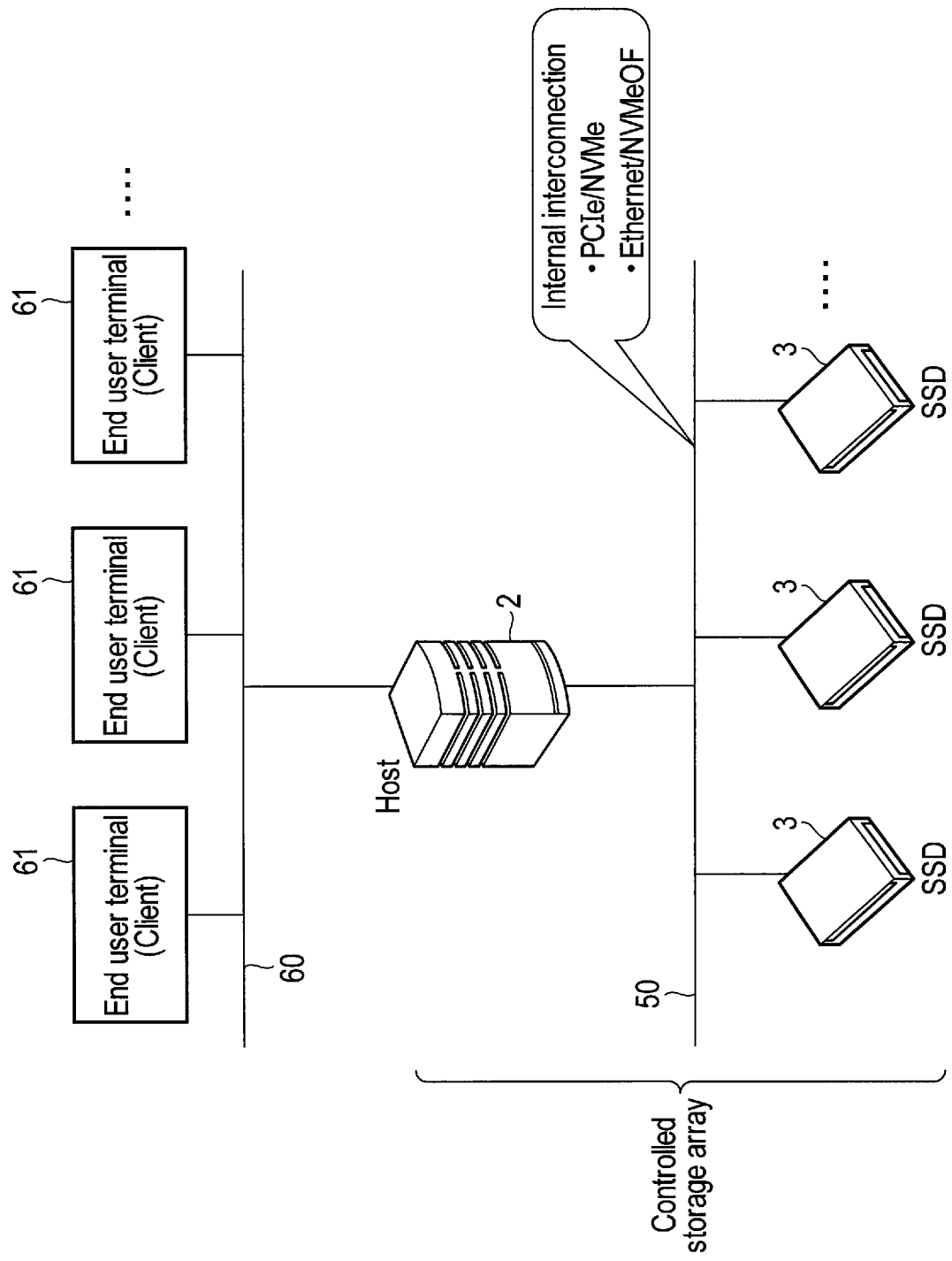
FIG. 1 is a block diagram illustrating a relationship between a memory system according to the embodiment and a host.

FIG. 1 is a block diagram illustrating a relationship between a host and a memory system according to the embodiment.

The memory system is a semiconductor storage device configured to write data into a nonvolatile memory and to read data from the nonvolatile memory. This memory system is implemented as a solid state drive (SSD) 3 including a NAND flash memory.

A host (host device) 2 is configured to control a plurality of SSDs 3. The host 2 can be implemented by an information processing apparatus configured to use a flash array including a plurality of SSDs 3 as a storage. The information processing apparatus may be a personal computer or a server computer.

The SSD 3 may also be used as one of a plurality of storage devices provided in a storage array. The storage array may be connected to the information processing apparatus such as a server computer via a cable or a network. The storage array may include a controller which controls a plurality of storage devices (for example, a plurality of SSDs) in the storage array. When the SSD 3 is applied to the storage array, the controller of the storage array may function as a host of the SSD 3.

An example of a case where an information processing apparatus such as a server computer functions as the host 2 will be described below.

The host (server) 2 and the plurality of SSDs 3 are interconnected via an interface 50 (internal interconnection). An interface 50 for interconnection is not limited to this, but PCI Express (PCIe) (registered trademark), NVM Express (NVMe) (registered trademark), Ethernet (registered trademark), NVMe over Fabrics (NVMeOF) or the like can be used as the interface 50.

One of examples of the server computer which functions as the host 2 is a server computer (hereinafter referred to as a server) in a data center.

In a case where the host 2 is implemented by the server in the data center, the host (server) 2 may be connected to a plurality of end user terminals (clients) 61 via a network 60. The host 2 can provide various services to the end user terminals 61.

Examples of services which can be provided by the host (server) 2 are (1) Platform as a Service (PaaS) which provides a system running platform for each client (each end user terminal 61), (2) Infrastructure as a Service (IaaS) which provides an infrastructure such as a virtual server for each client (each end user terminal 61), and the like.

A plurality of virtual machines may be run on a physical server which functions as the host 2. Each of the virtual machines which run on the host 2 can function as a virtual server configured to provide various services for the client (end user terminal 61) corresponding to the virtual machine. In each virtual machine, an operating system and a user application which are used by the corresponding end user terminals 61 are executed. The operating system corresponding to each virtual machine includes an I/O service. The I/O service may be a block I/O service based on a logical block address (LBA) or a key-value store service.

In the operating system corresponding to each virtual machine, the I/O service issues I/O commands (a write command and a read command) in response to a request of write/read from the user application. The I/O commands are transmitted to the SSD 3 via one or more submission queues of the host 2.

The controller of the SSD 3 can write data into each of a plurality of storage regions included in a nonvolatile memory. The plurality of storage regions included in the nonvolatile memory can be used as a plurality of user data storage regions for storing user data or a nonvolatile buffer shared by the plurality of user data storage regions. The user data is indicative of data (write data) received from the host 2. The nonvolatile buffer is a storage region capable of temporarily storing user data to be written into any one of the plurality of user data storage regions, as needed.

Figure 2:
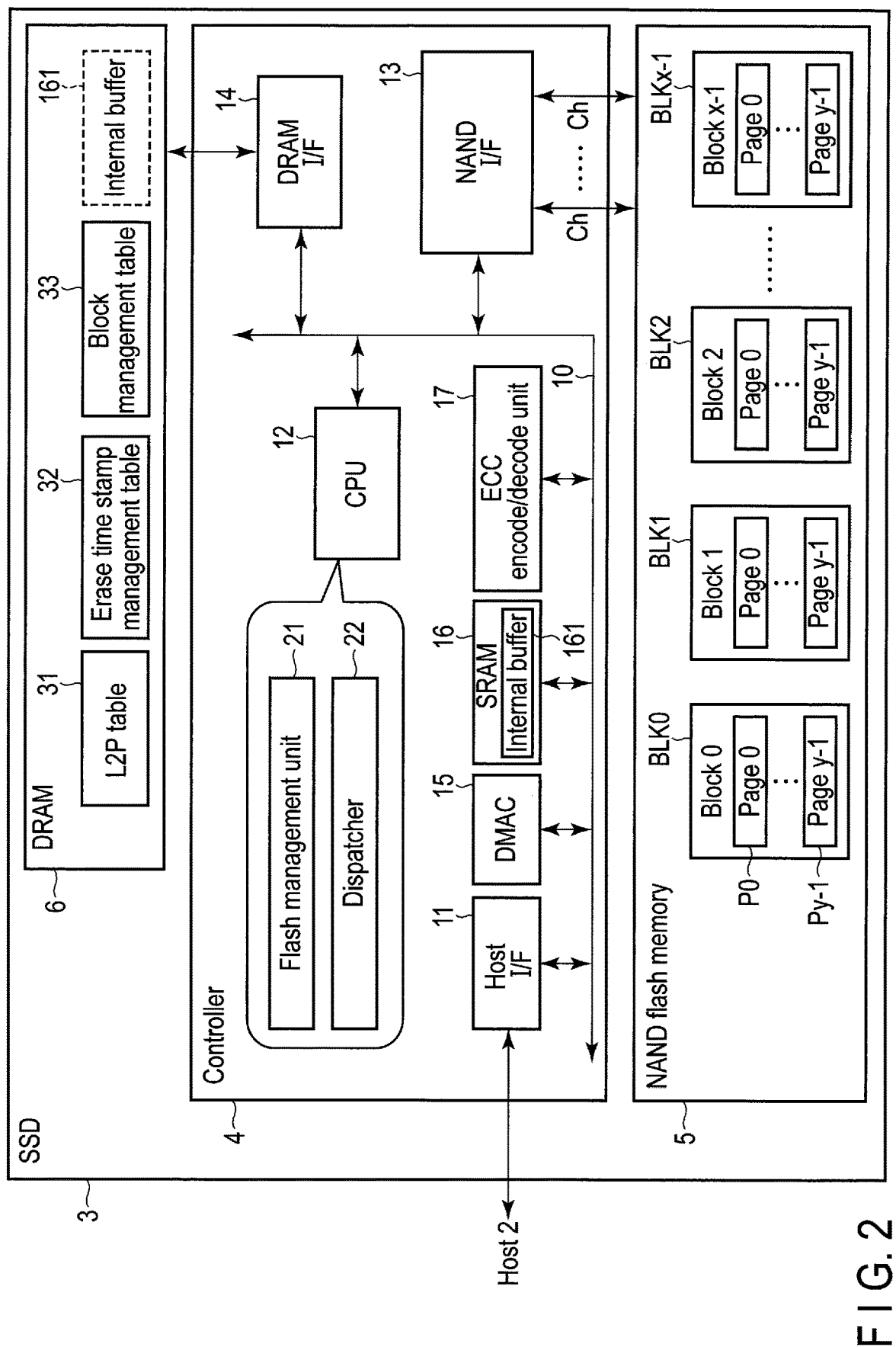
FIG. 2 is a block diagram illustrating a configuration example of the memory system according to the embodiment.

FIG. 2 illustrates a configuration example of the SSD 3.

The SSD 3 includes a controller 4 and a nonvolatile memory (for example, a NAND flash memory 5). The SSD 3 may also include a random access memory, for example, DRAM 6.

The NAND flash memory 5 includes a memory cell array including a plurality of memory cells arranged in a matrix. The NAND flash memory 5 may be a NAND flash memory of a two-dimensional structure or a NAND flash memory of a three-dimensional structure.

The memory cell array of the NAND flash memory 5 includes a plurality of blocks BLK0 to BLKx-1. Each of the blocks BLK0 to BLKx-1 includes a plurality of pages (in this example, pages P0 to Py-1). Each of the blocks BLK0 to BLKx-1 is a unit for an erase operation of erasing data. The blocks may also be referred to as erase blocks, physical blocks or physical erase blocks. The pages P0 to Py-1 are units of data write and read operations.

The controller 4 is electrically connected to the NAND flash memory 5 which is a nonvolatile memory via a NAND interface 13 such as Toggle NAND flash interface or Open NAND Flash Interface (ONFI). The controller 4 operates as a memory controller configured to control the NAND flash memory 5. The controller 4 may be realized by a circuit such as a System-on-a-chip (SoC).

The controller 4 supports Zoned Namespaces (ZNS) conforming to NVMe specification and can operate the SSD 3 as a zoned device.

The zoned device is a device which is accessed by using a plurality of logical address ranges obtained by dividing logical address spaces for accessing the SSD 3. The logical address space for accessing the SSD 3 includes contiguous logical addresses used by the host 2 to access the SSD 3.

The controller 4 can allocate one storage region of the plurality of storage regions included in the NAND flash memory 5 to each of the plurality of zones. One storage region allocated to a zone is used as the above-explained user data storage region and accessed by using contiguous logical addresses included in the logical address range assigned to this zone. Logical block addresses (LBAs) are normally used as the logical addresses.

As illustrated in FIG. 3, the NAND flash memory 5 may include a shared quad-level cell buffer (shared QLC buffer) 201 and a quad-level cell region (QLC region) 202. The QLC region 202 includes a plurality of quad-level cell blocks (QLC blocks).

Each of the plurality of QLC blocks is a block where data are written in a write mode (also referred to as a program mode) of storing 4 bits per memory cell. The plurality of QLC blocks in the QLC region 202 may be used as the plurality of storage regions explained above. In this case, any one of the plurality of QLC blocks is allocated to each of the plurality of zones explained above.

FIG. 3 illustrates an example of a case where N+1 QLC blocks are used as N+1 zones (zone #0 to zone #N). In this case, the LBA space of the SSD 3 is divided into N+1 LBA ranges. These N+1 LBA ranges are used for the host 2 to selectively access the N+1 zones. The SSD 3 may notify the host 2 of a starting LBA of each zone in the LBA space to enable the host 2 to specify an access target zone.

Basically, the host 2 is required to sequentially execute writing within one zone. For this reason, as regards each of the N+1 zones, the host 2 manages a write pointer (WP) indicative of a next write location within the zone. At the start of writing within a certain zone, the write pointer (WP)

is indicative of the starting LBA of this zone as a next write location of this zone. The value of the write pointer (WP) is made to advance as write commands (write requests) to write data into this zone are issued.

In the operation of writing data into each of the QLC blocks, 4-page data are written to a plurality of memory cells connected to the same word line. The 4-bit data can be thereby written per memory cell.

The shared QLC buffer 201 may include several QLC blocks. The shared QLC buffer 201 is an example of the above-explained nonvolatile buffer, and is used to persistently store the user data to be written to each zone, as needed. In the present embodiment, one or more QLC blocks of the plurality of QLC blocks in the QLC region 202 are allocated as the shared QLC buffer 201. In the operation of writing the user data into each of the QLC blocks allocated as the shared QLC buffer 201, too, 4-page data are written to a plurality of memory cells connected to the same word line. The 4-bit data can be thereby written per memory cell.

A foggy-fine write operation may be used in either of the shared QLC buffer 201 and the QLC region 202, as the write mode applied to each of the QLC blocks. The foggy-fine write operation is an example of a write mode in which reading of data written in one of a plurality of pages included in the block can be executed after writing data into one or more pages subsequent to this page.

The foggy-fine write operation is executed by multiple-time write operations (foggy write operation and fine write operation) to a group of memory cells connected to the same word line. The initial write operation (foggy write operation) is a write operation of roughly setting a threshold voltage of each memory cell, and the second write operation (fine write operation) is a write operation of adjusting the threshold voltage of each memory cell.

In a case where the SSD 3 is used as a storage device of the server computer, for example, a plurality of zones corresponding to a plurality of applications (or a plurality of clients) are often concurrently used such that, for example, a plurality of types of data are written to different zones, respectively. In this case, the time from the start of write into the zone until the whole zone is filled with data is often different for each zone.

In general, in the nonvolatile memory such as a NAND flash memory, writing into all pages in a certain block needs to be finished within a limit time (also referred to as a write limit time) after the execution of the erase operation for this block.

Therefore, when the time required from the start of writing into a certain zone until this zone becomes a full state is too long, reliability of the block (QLC block in this example) of the NAND flash memory 5 used as this zone often cannot be assured or writing into the QLC block often cannot be normally executed.

However, in the case of using different zones for writing from different applications (or different clients) as described above, when the frequency of writing from a certain application (or a certain client) is low or the amount of data which are written by a certain application (or a certain client) is small, the speed of writing into the zone used by this application often becomes slower.

In this case, the QLC block allocated to the zone may be compulsorily set to a full state by writing dummy data into the entire unwritten region of the QLC block allocated to the zone. In this case, however, the write amount of data other than the user data may increase and, as a result, increase in the write amplification and reduction in the use efficiency of the storage region in the NAND flash memory 5 may be caused.

In addition, it often cannot be presumed on the host 2 side in which zone the speed of writing is slower.

Thus, in the present embodiment, during a period from the execution of the erase operation for a QLC block allocated as a certain zone until a first time elapses, the controller 4 controls writing to this QLC block in a first mode of capable of writing only write data corresponding to this zone into this QLC block.

Then, when the first time has elapsed after the execution of the erase operation for the QLC block, in a state in which an unwritten region having a size larger than or equal to a first size remains in the QLC block, the controller 4 changes the mode of controlling the QLC block from the first mode to a second mode of capable of writing write data corresponding to each of all zones into the QLC block.

Figure 4:
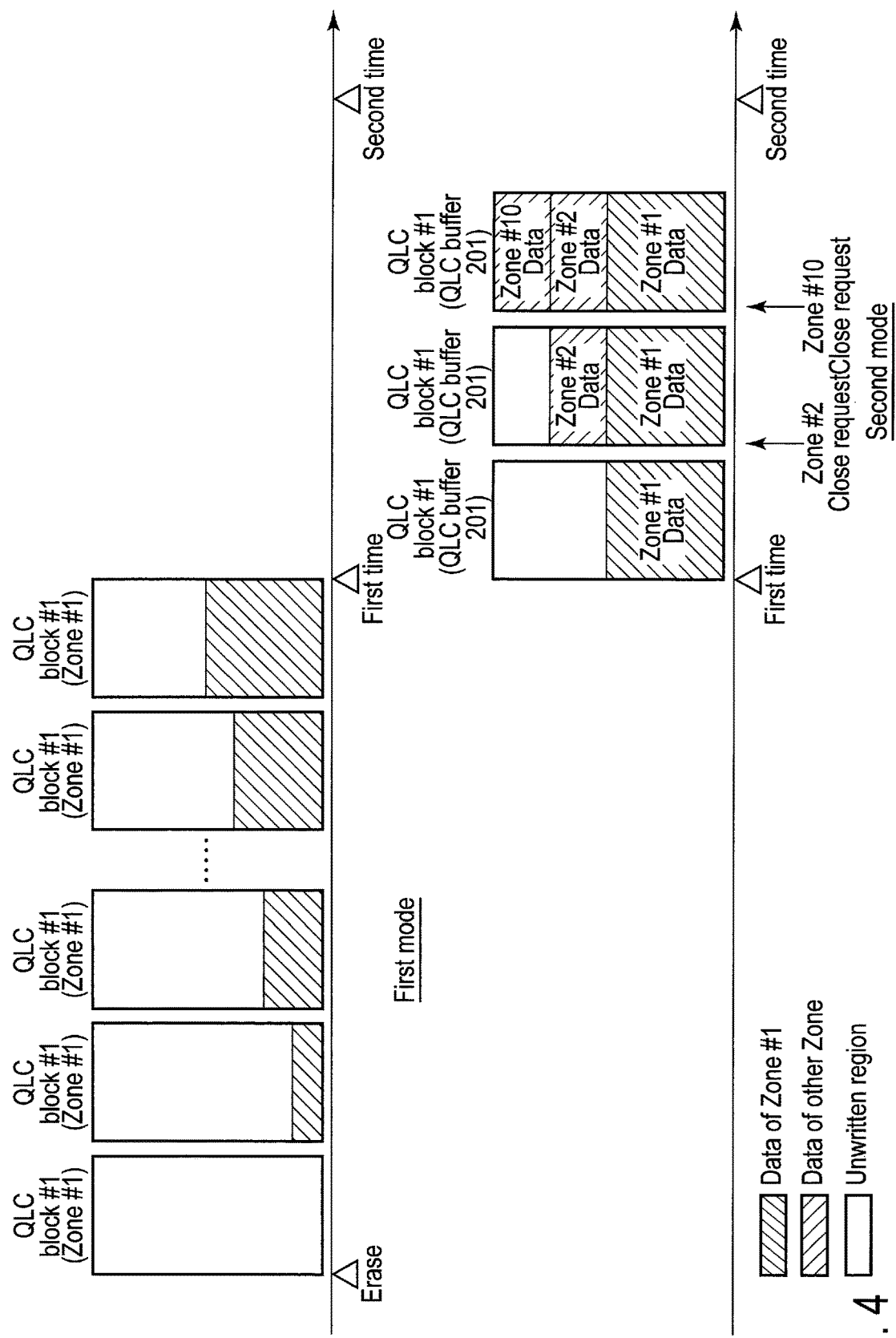
FIG. 4 is a diagram illustrating a first mode and a second mode, which are used to control a first QLC block assigned to a first zone.

FIG. 4 is a diagram illustrating the above-described first mode and second mode, which are used to control QLC block #1 allocated to zone #1.

The controller 4 executes the erase operation for the QLC block #1 allocated to the zone #1 and thereby sets the zone #1 to a state (open state) in which data write can be executed. The controller 4 controls writing into the QLC block #1 in the first mode, during a period from the execution of the erase operation for the QLC block #1 is executed until the first time elapses.

In the first mode, when the controller 4 receives one or more write commands (write requests) for specifying the zone #1 from the host 2, the controller 4 writes the write data associated with a set of the one or more received write requests into the QLC block #1 allocated to the zone #1.

More specifically, the controller 4 executes an operation of transferring the write data associated with a set of the one or more received write requests, from a write buffer of the host 2 to an internal buffer in the controller 4, and an operation of writing the write data transferred to the internal buffer into the QLC block #1.

Therefore, when the host 2 transmits one or more write requests for specifying the zone #1 to the SSD 3, and the write data associated with the one or more write requests are thereby written into the QLC block #1. Thus, the amount of the write data stored in the QLC block #1 increases as the time elapses.

The controller 4 checks the speed of writing to the zone #1 when the first time has elapsed after executing the erase operation of the QLC block #1. When the unwritten region of the first size or more does not remain in the QLC block #1, the controller 4 determines there is high possibility that the zone #1 will become a full state within a write limit time (second time) after the execution of the erase operation of the QLC block #1. In this case, the controller 4 maintains the first mode and continues the operation of controlling the write into the QLC block #1 in the first mode.

In contrast, when the speed of writing into the zone #1 by the host 2 is slow and the unwritten region of the first size or more thereby remains in the QLC block #1, the controller 4 determines there is high possibility that the QLC block #1 will not become a full state even if the write limit time (second time) has elapsed after the execution of the erase operation of the QLC block #1. Then, the controller 4 changes the mode of controlling the QLC block #1 to the above-described second mode as illustrated in FIG. 4.

In this case, the controller 4 does not execute the first-mode write operation of writing the write data associated with each write command (write request) for specifying the zone #1 into the QLC block #1, but instead allocates the QLC block #1 as the above-described shared QLC buffer 201. In other words, the controller 4 starts using the QLC block #1 not as the storage region dedicated to the zone #1, but as the shared QLC buffer 201 that is a storage region common to all zones.

When not executing writing the data into a certain zone in the open state for a while, the host 2 transmits to the SSD 2 a close request for causing the state of this zone to transition from the writable state (open state) to the state (closed state) in which the writing is suspended, in order to enable the region in the write buffer of the host 2 used for this zone to be released. When a certain region in the write buffer of the host 2 is released, this region is usable to store the write data to be written into the other zone. Therefore, in the environment in which a large number of zones are opened, the host 2 may transmit to the SSD3 the close requests for specifying various zones comparatively frequently.

When receiving from the host the close request for causing the state of the zone #1 or the other zone to transition to the closed state, the controller 4 executes both (i) an operation of acquiring from the write buffer of the host 2 the remaining write data of the write data associated with one or more received write requests for specifying the zone #1 or the other zone, the remaining write data being data un-transferred to the internal buffer in the controller 4, and (ii) an operation of writing the acquired remaining write data into the unwritten region of the QLC block #1 allocated as the shared QLC buffer 201.

The remaining write data is the write data unwritten into the NAND flash memory 5. The write data can be persistently stored by writing the write data into the shared QLC buffer 201. Therefore, the region in the write buffer of the host 2 where the write data is stored can be released.

As illustrated in FIG. 4, for example, when receiving the close request for specifying zone #2 from the host 2, the controller 4 acquires from the write buffer of the host 2 the unwritten write data corresponding to the zone #2 (i.e., the remaining write data un-transferred to the internal buffer in the controller 4, of the write data associated with one or more received write requests for specifying the zone #2), and writes the acquired write data into the unwritten region of the QLC block #1 allocated as the shared QLC buffer 201.

In addition, for example, when receiving the close request for specifying zone #10 from the host 2, the controller 4 acquires from the write buffer of the host 2 the unwritten write data corresponding to the zone #10 (i.e., the remaining write data un-transferred to the internal buffer in the controller 4, of the write data associated with one or more received write requests for specifying the zone #10), and writes the acquired write data into the unwritten region of the QLC block #1 allocated as the shared QLC buffer 201.

Thus, by allocating the QLC block #1 as the shared QLC buffer 201, the time required until the QLC block #1 becomes a full state can be reduced as compared with a case of continuing using the QLC block #1 in the first mode.

When the number of close requests issued by the host 2 is small and when the QLC block #1 does not become the full state even if the write limit time (second time) longer than the first time has elapsed after execution of the erase operation of the QLC block #1, the controller 4 may set the QLC block #1 to the full state by writing the dummy data generated by the controller 4 into the unwritten region of the QLC block #1.

When the data size of the write data corresponding to the zone #1 stored in the shared QLC buffer 201 reaches the capacity of one zone or when the sum of the data size of the write data corresponding to the zone #1 stored in the shared QLC buffer 201 and the data size of the subsequent write data corresponding to the zone #1 stored in the write buffer of the host 2 reaches the capacity of one zone, the controller 4 copies the write data corresponding to the zone #1 stored in the shared QLC buffer 201, or both the write data corresponding to the zone #1 stored in the shared QLC buffer 201 and the subsequent write data corresponding to the zone #1 stored in the write buffer of the host 2, from the shared QLC buffer 201 or from both the shared QLC buffer 201 and the write buffer of the host 2 to the QLC block newly allocated to the zone #1. The QLC block newly allocated to the zone #1 can be thereby rapidly set to the full state.

The write data corresponding to the zone #1 stored in the shared QLC buffer 201 include the write data written to the QLC block #1 by the first-mode write operation and the write data written to the shared QLC buffer 201 by one or more close requests for specifying the zone #1. The subsequent write data corresponding to the zone #1 stored in the write buffer of the host 2 is the write data associated with one or more subsequent write requests for specifying the zone #1.

Figure 5:
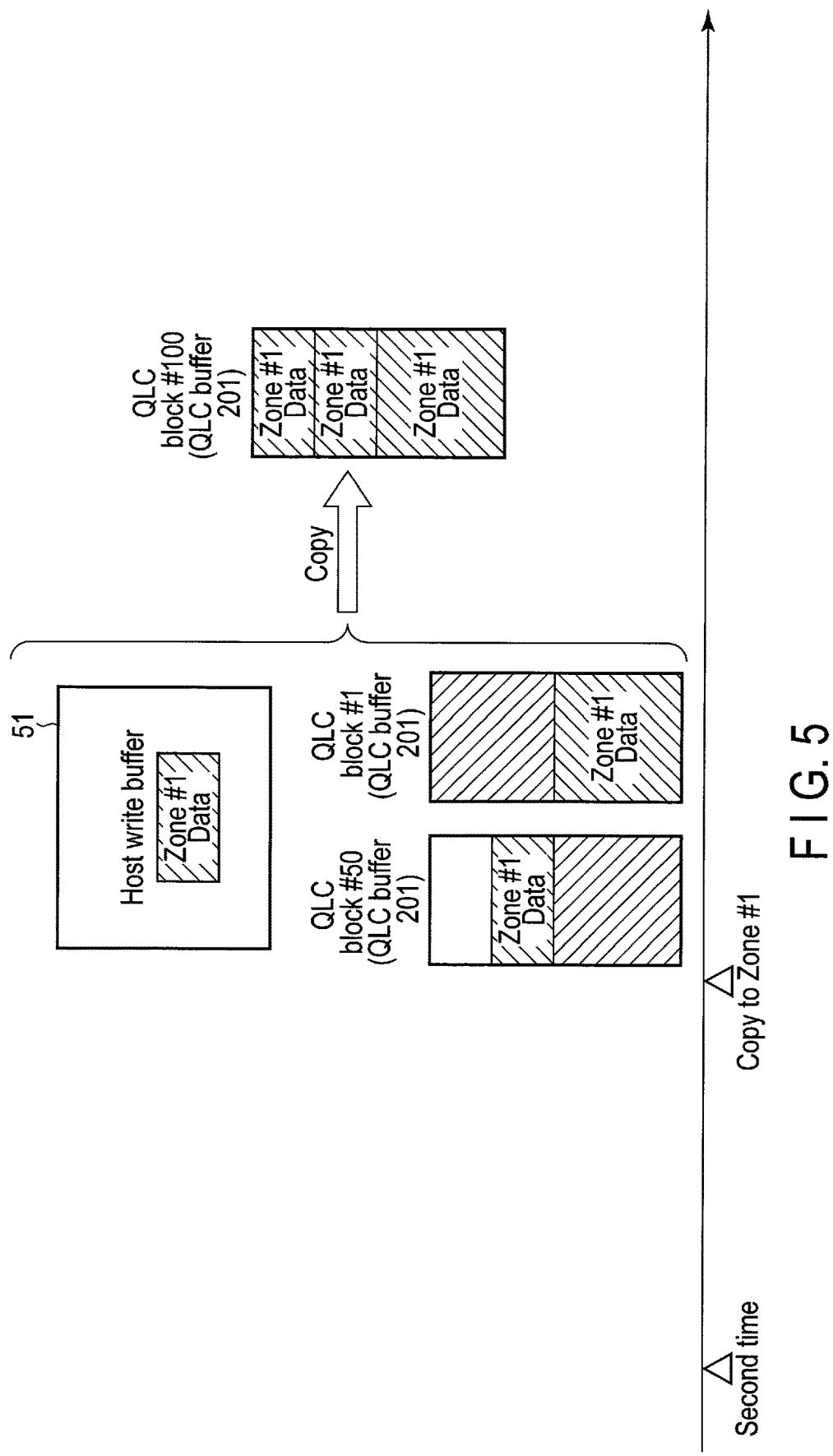
FIG. 5 is a diagram illustrating an operation of copying write data corresponding to the first zone from the shared QLC buffer and a write buffer of the host to a second QLC block.

For example, it is assumed in FIG. 5 that the total of both the data size of the write data corresponding to the zone #1 stored in the shared QLC buffer 201 and the data size of the subsequent write data corresponding to the zone #1 stored in the write buffer 51 of the host 2 reaches the capacity of one zone.

The QLC block #50 is the other QLC block newly allocated as the shared QLC buffer 201 after the whole QLC block #1 allocated as the shared QLC buffer 201 is filled with the data. The write data corresponding to the zone #1 stored in the QLC block #50 is the write data written to the QLC block #50 by the close request for specifying the zone #1.

The write data corresponding to the zone #1 stored in the write buffer 51 of the host 2 is the write data associated with one or more subsequent write requests for specifying the zone #1.

When the total of the data size of the write data corresponding to the zone #1 written to the QLC block #1 by the first-mode write operation, the data size of the write data corresponding to the zone #1 written to the QLC block #50 by the close request, and the data size of the subsequent write data corresponding to the zone #1 stored in the write buffer 51 of the host 2 reaches the capacity of one zone, a write start condition corresponding to the second mode (also referred to as a copy start condition) is satisfied.

When the write start condition is satisfied, the controller 4 allocates a new QLC block (in this example, QLC block #100) to the zone #1 and executes the erase operation for the QLC block #100. Then, the controller 4 copies the write data corresponding to the zone #1 from both the shared QLC buffer 201 and the write buffer 51 of the host 2 to the QLC block #100 newly allocated to the zone #1.

The write start condition corresponding to the second mode is often satisfied by the only write data corresponding to the zone #1 stored in the shared QLC buffer 201. In this case, the controller 4 copies the write data corresponding to the zone #1 from the shared QLC buffer 201 to the QLC block #100.

Thus, in the present embodiment, when the first time has elapsed after execution of the erase operation of the QLC block #1 in a state in which an unwritten region having a size larger than or equal to the first size remains in the QLC block #1, the QLC block #1 is allocated as the shared QLC buffer 201 where the write data for all zones are writable. For this reason, even when the speed of writing into the zone #1 by the host 2 is slow, the QLC block #1 can be caused to transition to the full state within a write limit time, by using the write data corresponding to various other zones, at a high possibility. Therefore, the time required until the QLC block #1 becomes the full state can be reduced as compared with a case of continuing using the QLC block #1 as the storage region dedicated to the zone #1.

The length of the first time can be freely set on the SSD 3 side. Therefore, for example, the controller 4 may manage the degree of wear of each of the plurality of QLC blocks and change the length of the first time for each QLC block, on the basis of the degree of wear of each QLC block.

For example, the controller 4 may classify the plurality of QLC blocks into a group having the degree of wear within a first amount and a group having the degree of wear within a second amount greater than the first amount, and set the first time to be applied to each of the QLC blocks belonging to the group having the degree of wear within the first amount to be longer than the first time to be applied to each of the QLC blocks belonging to the group having the degree of wear within the second amount. The time to execute writing in the first mode can be thereby made longer for each of the QLC blocks having a small degree of wear. As a result, since the number of QLC blocks necessary to be allocated to the shared QLC buffer 201 is reduced, the number of QLC blocks used as the user regions can be increased.

The degree of wear of each of the QLC blocks may be determined based on, for example, the number of programs/ erase cycles of each of the QLC blocks, the bit error rate of each of the QLC blocks, or the number of programs/erase errors of each of the QLC blocks, or a certain combination of the number of programs/erase cycles, the bit error rate, and the number of programs/erase errors.

Next, a configuration example of the NAND Flash Memory 5 will be described. As illustrated in FIG. 6, the NAND flash memory 5 may include a plurality of NAND flash memory dies (NAND flash memory chips). Each of the NAND flash memory dies can operate independently. For this reason, the NAND flash memory dies function as units capable of parallel operations. FIG. 6 illustrates an example of a case where sixteen channels Ch. 1 to Ch. 16 are connected to the NAND interface 13, and two NAND flash memory dies are connected to each of sixteen channels Ch. 1 to Ch. 16. In this case, sixteen NAND flash memory dies #1 to #16 connected to the channels Ch. 1 to Ch. 16 may be organized into a bank #0 and the remaining sixteen NAND flash memory dies #17 to #32 connected to the channels Ch. 1 to Ch. 16 may be organized into a bank #1. The banks function as units for causing a plurality of memory dies to operate in parallel by bank interleaving. In the configuration example illustrated in FIG. 6, a maximum of thirty-two NAND flash memory dies can operate in parallel by sixteen channels and bank interleaving of two banks.

The erase operation may be executed in units of one block (physical block) or units of block group including a set of a plurality of physical blocks capable of executing the parallel operation. The block group is also referred to as a super block.

One block group, i.e., one super block including a set of a plurality of physical blocks are not limited to these, but may include a total of thirty-two physical blocks each selected from the NAND flash memory dies #1 to #32. Each of the NAND flash memory dies #1 to #32 may have a multi-plane structure. For example, when each of the NAND flash memory dies #1 to #32 has a multi-plane configuration including two planes; one super block may include a total of sixty-four physical blocks each selected from sixty-four planes corresponding to the NAND flash memory dies #1 to #32.

Figure 7:
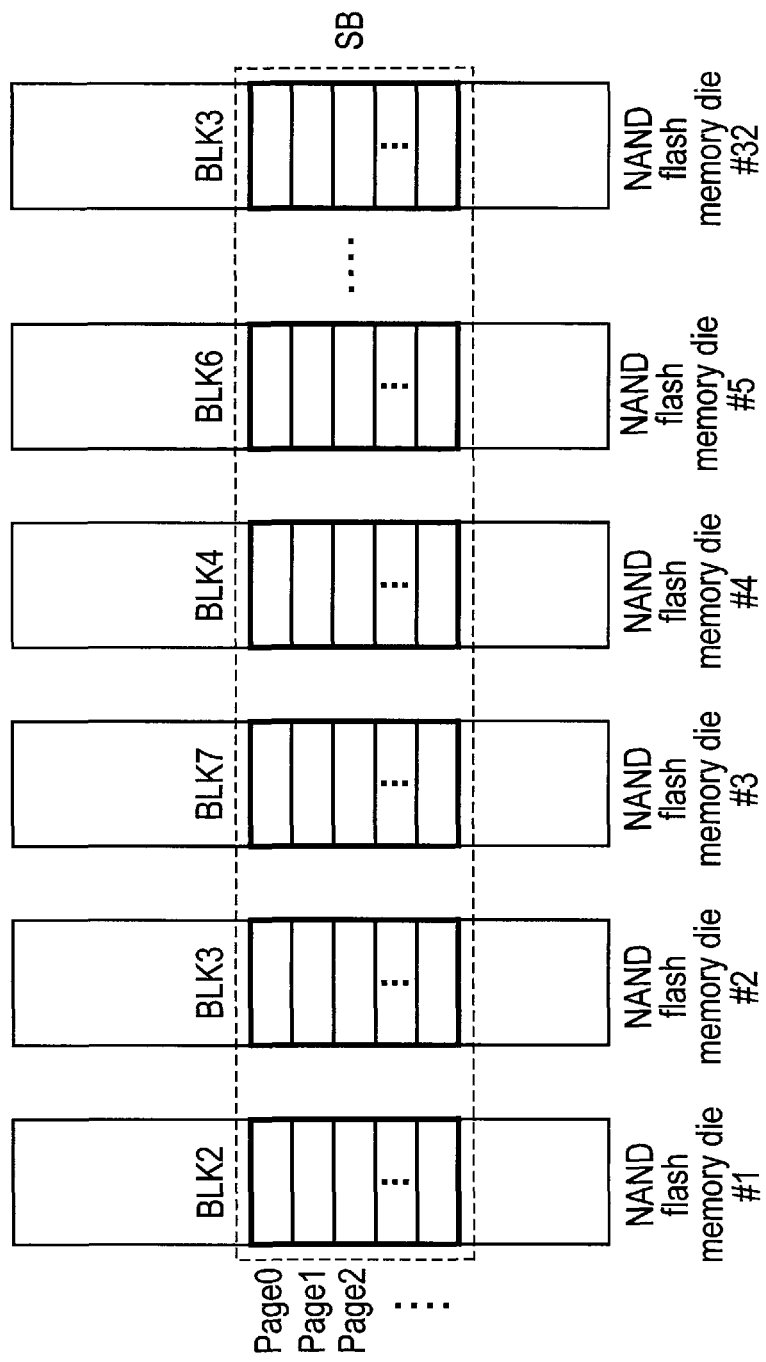
FIG. 7 is a diagram illustrating a configuration example of a block group used in the memory system according to the embodiment.

FIG. 7 illustrates an example of a super block including thirty-two physical blocks (in the present example, physical block BLK2 in the NAND flash memory die #1, physical block BLK3 in the NAND flash memory die #2, physical block BLK7 in the NAND flash memory die #3, physical block BLK4 in the NAND flash memory die #4, physical block BLK6 in the NAND flash memory die #5, . . . , physical block BLK3 in the NAND flash memory die #32).

Each of the QLC blocks in the QLC region 202 illustrated in FIG. 3 may be implemented by one super block (QLC super block) or one physical block (QLC physical block). One super block may utilize a configuration including only one physical block and, in this case, one super block is equivalent to one physical block.

Next, the configuration of the controller 4 in FIG. 2 will be described.

The controller 4 can function as a flash translation layer (FTL) configured to execute data management and block management of the NAND flash memory 5. The data management executed by the FTL includes (1) management of mapping information indicative of correspondences between each of logical addresses and each of physical addresses of the NAND flash memory 5, (2) a process for concealing restrictions of the NAND flash memory 5 (for example, the read/write operations in units of pages and the erase operation in units of blocks), and the like. The logical addresses are addresses used by the host 2 for addressing a logical address in a logical address space of the SSD 3. As the logical addresses, logical block addresses (LBAs) can be used.

The management of mapping between each of the logical addresses used by the host 2 to access the SSD 3 and each of the physical addresses of the NAND flash memory 5 is executed by using an address translation table (i.e., a logical-to-physical address translation table: L2P table) 31. The controller 4 may manage mapping between each of the logical addresses and each of the physical addresses in units of predetermined management sizes, by using the L2P table 31. A physical address corresponding to a certain logical address is indicative of the latest physical storage location in the NAND flash memory 5 in which the data corresponding to this logical address is written. The L2P table 31 may be loaded from the NAND flash memory 5 into the DRAM 6 when the SSD 3 is powered on.

In the present embodiment, since the writing within each zone is executed sequentially, the controller 4 may manage the only correspondence between the starting LBA of each zone and an identifier (for example, a block address) for identifying a QLC block allocated to each zone, by using the L2P table 31.

The block management includes management of defective blocks, wear leveling, garbage collection (GC), and the like. The wear leveling is an operation for leveling the respective numbers of rewrite operations (i.e., the numbers of program/erase cycles) for blocks.

GC is an operation of increasing the number of free blocks. The free block is indicative of a block including no valid data. In the GC, the controller 4 copies valid data in several blocks including both the valid data and invalid data to another block (e.g., a free block). The valid data is indicative of data associated with a certain logical address. For example, data referred to from the L2P table 31 (i.e., data linked to the logical address as the latest data) may be valid data and may be read later by the host 2. The invalid data is indicative of data which is not associated with any logical addresses. The data which is not associated with any logical addresses is data which may not be read any more by the host 2. Then, the controller 4 updates the L2P table 31 and maps physical addresses of copy destination to the logical addresses of copied valid data, respectively. A block where only invalid data is stored after valid data is copied to the other block is released as a free block. This block can be thereby reused for data write after the erase operation for this block is executed.

The controller 4 includes a host interface 11, a CPU 12, a NAND interface 13, a DRAM interface 14, a direct memory access controller (DMAC) 15, a static RAM (SRAM) 16, an ECC encode/decode unit 17, and the like. The host interface 11, the CPU 12, the NAND interface 13, the DRAM interface 14, the DMAC 15, the SRAM 16, and the ECC encode/decode unit 17 are interconnected via the bus 10.

The host interface 11 is a host interface circuit configured to execute communication with the host 2. The host interface 11 may be, for example, a PCIe controller (NVMe controller). Alternatively, when the SSD 3 is configured to be connected to the host 2 via Ethernet (registered trademark), the host interface 11 may be an NVMe over Fabrics (NVMeOF) controller.

The host interface 11 receives various commands from the host 2. These commands include a write command, a read command, an open zone command, a close zone command, a reset zone command, and the like.

The write command is a command (write request) to write into the NAND flash memory 5 the data which is to be written (write data). The write command includes, for example, a logical address (starting LBA) indicative of a first sector where the write data is to be written, the data size of the write data, a data pointer (buffer address) indicative of a location in the memory (write buffer) of the host 2 where the write data is stored, and the like. The memory of the host 2 is also simply referred to as a host memory in the following descriptions.

An upper bit portion of the logical address (starting LBA) included in the write command is used as an identifier specifying a zone where write data associated with this write command is to be written. In addition, a lower bit portion of the logical address (starting LBA) included in the write command specifies an offset within the zone where the write data is to be written.

Therefore, the logical address specified by the write command is indicative of one of the plurality of zones and the offset within the one zone where write data is to be written.

The data size of the write data may be specified by, for example, the number of sectors (logical blocks). One sector corresponds to the minimum data size of the write data which can be specified by the host 2. That is, the data size of the write data is indicated by the multiple of sectors.

The read command is a command (read request) to read data from the NAND flash memory 5. The read command includes, for example, a logical address (starting LBA) indicative of a first sector where data (read target data) is to be written, the data size of the read target data, a data pointer (buffer address) indicative of a location in the host memory (read buffer) to which the read target data is to be transferred, and the like.

The upper bit portion of the logical address included in the read command is used as an identifier specifying a zone where the read target data is stored. In addition, the lower bit portion of the logical address included in the read command specifies the offset within this zone where the read target data is stored. Therefore, the logical address specified by the read command is indicative of the zone, and the offset within the zone where the read target data is stored.

The open zone command is a command (open request) to cause one of the plurality of zones each of which is n an empty state to transition to an open state which can be used for data write. The open zone command includes a logical address specifying the zone which is to be caused to transition to the open state. For example, the upper bit portion of the logical address specified by the open zone command is used as an identifier specifying the zone which is to be caused to transition to the open state.

The close zone command is a command (close request) to cause one of zones in the open state to transition to the closed state in which the writing is suspended. The close zone command includes a logical address specifying the zone which is to be caused to transition to the closed state. For example, the upper bit portion of the logical address specified by the close zone command is used as an identifier specifying the zone which is to be caused to transition to the closed state.

The reset zone command is a command (reset request) to reset and cause the zone where rewriting is to be executed to transition to the empty state. For example, the reset zone command is used to cause a full state zone filled with data to transition to the empty state where the zone does not include valid data. The valid data is indicative of data associated with the logical address. The reset zone command includes a logical address specifying the zone which is to be caused to transition to the empty state. For example, the upper bit portion of the logical address specified by the reset zone command is used as an identifier specifying the zone which is to be caused to transition to the empty state. The write pointer value corresponding to the zone caused to transition to the empty state is set to a value indicative of the starting LBA of this zone.

The CPU 12 is a processor configured to control the host interface 11, the NAND interface 13, the DRAM interface 14, the DMAC 15, the SRAM 16, and the ECC encode/decode unit 17. The CPU 12 loads a control program (firmware) from the NAND flash memory 5 or a ROM (not illustrated) into the DRAM 6 in response to power-on of the SSD 3 and executes the firmware to execute various processes. The firmware may be loaded on the SRAM 16. The CPU 12 can execute command processes for processing various commands from the host 2, and the like. The operations of the CPU 12 are controlled by the above-described firmware. A part or all parts of the command process may be executed by dedicated hardware in the controller 4.

The CPU 12 can function as a flash management unit 21 and a dispatcher 22. Incidentally, a part or all parts of each of the flash management unit 21 and the dispatcher 22 may also be implemented by dedicated hardware in the controller 4.

The flash management unit 21 manages mapping between the plurality of zones and the plurality of QLC blocks included in the QLC region 202, and allocates any one of the QLC blocks in the QLC region 202 to each of the zones. One QLC block may be one physical block or one super block including a plurality of physical blocks.

The flash management unit 21 receives from the host 2 one or more write requests each for specifying a zone where the data is to be written.

For example, the flash management unit 21 executes the erase operation for the QLC block #1 allocated to the first zone #1, in response to the reception of the open request for specifying the first zone #1 from the host 2. In this case, the flash management unit 21 stores, into an erase time stamp management table 32, an erase time stamp indicative of the time (for example, year, month, day, hour, minute, and second) at which the erase operation of the QLC block #1 is executed.

In addition, for example, the flash management unit 21 executes the erase operation for the QLC block #2 allocated to the second zone #2, in response to the reception of the open request for specifying the first zone #2 from the host 2. The flash management unit 21 stores, into an erase time stamp management table 32, an erase time stamp indicative of the time at which the erase operation of the QLC block #2 is executed.

Then, in response to the reception of one or more write requests for specifying the first zone #1 from the host 2, the flash management unit 21 transfers the write data associated with a set of the received write requests from the write buffer 51 of the host 2 to the internal buffer 161 of the controller 4. A part of the storage region of the SRAM 16 may be used as the internal buffer 161 or a part of the storage region of the DRAM 6 may be used as the internal buffer 161.

Then, the flash management unit 21 writes the write data transferred to the internal buffer 161 into the QLC block #1 allocated to the first zone #1. For example, the flash management unit 21 writes the write data transferred to the internal buffer 161 into the QLC block #1 by the foggy-fine write operation of writing the data of 4 bits per memory cell.

In addition, in response to the reception of one or more write requests for specifying the second zone #2 from the host 2, the flash management unit 21 transfers the write data associated with a set of the received write requests from the write buffer 51 of the host 2 to the internal buffer 161 of the controller 4.

Then, the flash management unit 21 writes the write data transferred to the internal buffer 161, into the QLC zone #2 allocated to the second zone #2. For example, the flash management unit 21 writes the write data transferred to the internal buffer 161 into the QLC block #2 by the foggy-fine write operation of writing the data of 4 bits per memory cell.

Furthermore, the flash management unit 21 executes a process of changing the mode of controlling the writing into the QLC block corresponding to each zone between the first mode and the second mode.

For example, it is assumed that the mode for the QLC block #1 is changed from the first mode to the second mode.

Every time the flash management unit 21 receives the close request (zone close command) from the host 2, the flash management unit 21 executes the following process.

The flash management unit 21 acquires from the write buffer 51 of the host 2 remaining write data un-transferred to the internal buffer 161, of the write data associated with one or more received write requests for specifying the close target zone specified by the close request. The flash management unit 21 writes the acquired remaining write data not into the QLC block corresponding to the close target zone specified by the close request, but into the shared QLC buffer 201. When the mode of controlling the QLC block #1 transitions to the second mode, the QLC block #1 is used as the shared QLC buffer 201. Therefore, the remaining write data corresponding to the close target zone is written into the QLC block #1. Then, the flash management unit 21 causes the state of the close target zone to transition from the open state to the closed state in which the writing is suspended.

When the process of writing the remaining write data into the QLC block corresponding to the close target zone specified by the close request is executed at each reception of the close request, the write buffer 51 of the host 2 may be occupied by a large number of write data of which writing into each zone to be caused to transition to the closed state cannot be completed.

That is, when the process of writing the remaining write data into the QLC block corresponding to the close target zone is executed, writing the data of a plurality of pages last written to this QLC block may not be able to be completed. For example, if the remaining write data are written into the QLC block corresponding to the close target zone by the foggy-fine write operation of writing the data of 4 bits per memory cell, writing the data of four pages last written into this QLC block may not be completed. This is because since the close request is a request for causing a certain zone to transition to the closed state, the host 2 may not issue the write request for this zone to the SSD 3 for a while after transmitting the close request. As a result, since the fine write operation corresponding to the data of four pages last written into the QLC block corresponding to this zone cannot be started, the data of four pages does not become readable from this QLC block for a comparatively long time. As a result, the region in the write buffer 51 of the host 2 where the write data of four pages are stored cannot be released.

When the page size is 16 KB, writing of the data having the size of 64 KB (=4×16 KB) cannot be completed. When each NAND flash memory die has a two plane structure, writing of the data having a size of 128 KB (=2×4×16 KB) cannot be completed.

Therefore, when the process of writing the remaining data into the QLC block corresponding to the close target zone specified by the close request is executed at each reception of the close request, it is considered necessary to maintain a large amount of data of which writing cannot be completed, in the write buffer 51 of the host 2. For example, in a case where a total of 1024 zones are caused to transition to the closed state, the write buffer 51 of the host 2 is occupied by the data having a size of 128 MB (=1024×128 KB).

In the present embodiment, the flash management unit 21 does not write the remaining write data into the QLC block corresponding to each zone that is to be closed, but writes the remaining write data into the shared QLC buffer 201 shared by the plurality of zones. Therefore, even when any one of the zones is closed, the remaining write data corresponding to each zone that is to be closed are written into the shared QLC buffer 201. Therefore, the amount of write data of which writing cannot be completed can be reduced and the region which can be released in the write buffer of the host 2 can be increased as compared with the structure of writing the remaining data into the QLC block corresponding to the close target zone specified by the close request at each reception of the close request.

Since the shared QLC buffer 201 is also composed of several QLC blocks, the data having a size of 128 KB last written into the shared QLC buffer 201 become readable after writing the subsequent data having a size of 128 KB into the shared QLC buffer 201.

Unlike the QLC block corresponding to the close target zone, however, writing into the shared QLC buffer 201 is not suspended. That is, writing into the shared QLC buffer 201 is executed every time the close request is received. Therefore, even when a total of 1024 zones are caused to transition to a closed state, the size of the data that are un-readable from the shared QLC buffer 201, of the write data that are to be written into these 1024 zones, can be suppressed to a maximum of 128 KB. Therefore, the amount of write data necessary to be maintained in the write buffer 51 of the host 2 can be remarkably reduced as compared with a case of writing the remaining write data into each zone to be closed.

Furthermore, in the present embodiment, since the QLC block corresponding to the zone where the speed of writing by the host 2 is slow is used as the shared QLC buffer 201, remaining write data corresponding to various zones are written into this QLC block. Therefore, the time required until the QLC block becomes the full state can be reduced.

The dispatcher 22 acquires each of the commands from the submission queue of the host 2. In the controller 4, a plurality of command queues that correspond to the plurality of opened zones, respectively, are managed. The dispatcher 22 classifies the acquired commands into write commands (write requests) and commands other than the write commands.

Furthermore, the dispatcher 22 classifies the write requests into a plurality of groups that correspond to the plurality of zones, respectively. Then, the dispatcher 22 stores the write requests belonging to same group, into the command queue corresponding to this group.

For example, the dispatcher 22 stores each write request for specifying the zone #1 into the command queue corresponding to the zone #1 and stores each write request for specifying the zone #2 into the command queue corresponding to the zone #2.

When the total size of the write data associated with a set of write requests for specifying the zone #1 reaches the minimum write size (for example, 64 KB) of each zone (each QLC block), the flash management unit 21 transfers the write data associated with the set of write requests, having the minimum write size, from the write buffer 51 of the host 2 to the internal buffer 161. In a case where each NAND flash memory die includes two planes, the minimum write size may be set 128 KB.

In addition, when the total size of the write data associated with a set of write requests for specifying the zone #2 reaches the minimum write size of each zone (each QLC block), the flash management unit 21 transfers the write data associated with the set of write requests, having the minimum write size, from the write buffer 51 of the host 2 to the internal buffer 161.

Thus, it is possible to suppress the internal buffer 161 being occupied by a large number of write data each having less than the minimum write size, which cannot be written into the NAND flash memory 5, by transferring the write data in units of the minimum write size from the write buffer 51 of the host 2 to the internal buffer 161, and the capacity of the internal buffer 161 considered necessary to be allocated can be thereby reduced.

The NAND interface 13 is a memory control circuit configured to control the NAND flash memory 5 under the control of the CPU 12.

The DRAM interface 14 is a DRAM control circuit configured to control the DRAM 6 under the control of the CPU 12. A part of the storage region of the DRAM 6 may be used as the storage region for storing the L2P table 31, the erase time stamp management table 32, and the block management table 33. The block management table 33 is used for storing management information corresponding to each of the plurality of QLC blocks.

The DMAC 15 executes data transfer between the write buffer 51 of the host 2 and the internal buffer 161 under control of the CPU 12. When the write data is to be transferred from the write buffer 51 of the host 2 to the internal buffer 161, the CPU 12 specifies for the DMAC 15 a transfer source address indicative of a location in the write buffer 51 of the host 2, the size of the write data to be transferred, and a transfer destination address indicative of a location in the internal buffer 161.

When the data is to be written into the NAND flash memory 5, the ECC encode/decode unit 17 encodes the data (data to be written) (ECC encoding), thereby adding an error correction code (ECC) to the data as a redundant code. When the data is read from the NAND flash memory 5, the ECC encode/decode unit 17 uses the ECC added to the read data to execute error correction of the data (ECC decoding).

Figure 8:
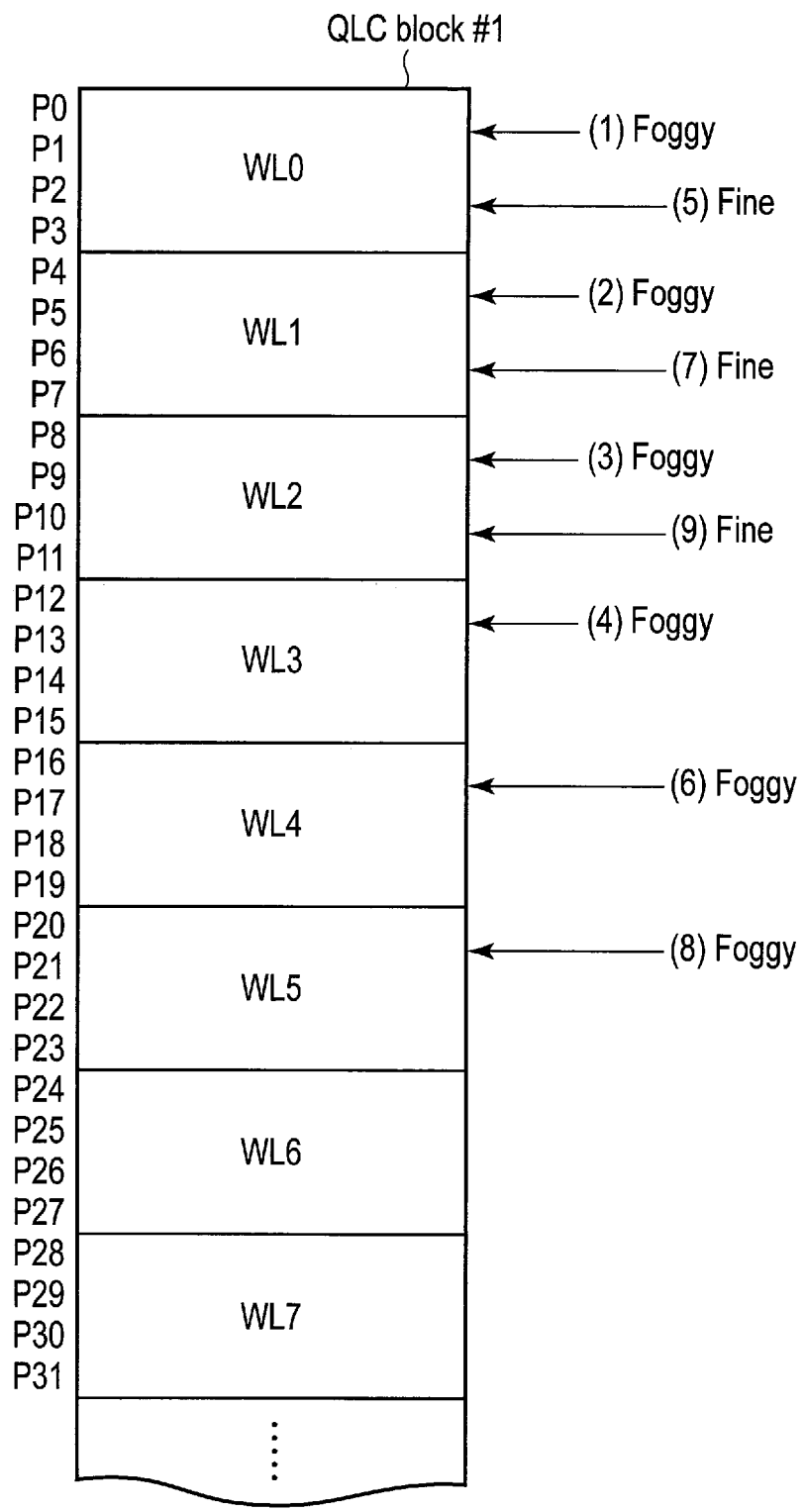
FIG. 8 is a diagram illustrating an operation of writing data to a QLC block in a mode of writing 4 bits per memory cell.

FIG. 8 is a diagram illustrating a write operation of writing the data into the QLC block in a write mode of writing 4 bits per memory cell.

An example of the foggy-fine write operation executed across four word lines will be described. The foggy-fine write operation for writing data into the QLC block #1 is executed in the following manner.

(1) First, write data of four pages (P0 to P3) is transferred to the NAND flash memory 5 in a page unit and the foggy write operation for writing the write data of the four pages (P0 to P3) into a plurality of memory cells connected to a word line WL0 in the QLC block #1 is executed.

(2) Next, write data of next four pages (P4 to P7) is transferred to the NAND flash memory 5 in a page unit and the foggy write operation for writing the write data of the four pages (P4 to P7) into a plurality of memory cells connected to a word line WL1 in the QLC block #1 is executed.

(3) Next, write data of next four pages (P8 to P11) is transferred to the NAND flash memory 5 in a page unit and the foggy write operation for writing the write data of the four pages (P8 to P11) into a plurality of memory cells connected to a word line WL2 in the QLC block #1 is executed.

(4) Next, write data of next four pages (P12 to P15) is transferred to the NAND flash memory 5 in a page unit and the foggy write operation for writing the write data of the four pages (P12 to P15) into a plurality of memory cells connected to a word line WL3 in the QLC block #1 is executed.

(5) When the foggy write operation to the plurality of memory cells connected to the word line WL3 is finished, a write target word line returns to the word line WL0 such that the fine write operation to the plurality of memory cells connected to the word line WL0 can be executed. Then, the same write data of four pages (P0 to P3) as the write data of the four pages (P0 to P3) used in the foggy write operation to the word line WL0 is transferred again to the NAND flash memory 5 in a page unit and the fine write operation for writing the write data of the four pages (P0 to P3) into the plurality of memory cells connected to the word line WL0 in the QLC block #1 is executed. The foggy-fine write operation for pages P0 to P3 is thereby finished. As a result, the data corresponding to the pages P0 to P3 can be read correctly from the QLC block #1.

(6) Next, write data of next four pages (P16 to P19) is transferred to the NAND flash memory 5 in a page unit and the foggy write operation for writing the write data of the four pages (P16 to P19) into a plurality of memory cells connected to a word line WL4 in the QLC block #1 is executed.

(7) When the foggy write operation to the plurality of memory cells connected to the word line WL4 is finished, a write target word line returns to the word line WL1 such that the fine write operation to the plurality of memory cells connected to the word line WL1 can be executed. Then, the same write data of four pages (P4 to P7) as the write data of the four pages (P4 to P7) used in the foggy write operation to the word line WL1 is transferred again to the NAND flash memory 5 in a page unit and the fine write operation for writing the write data of the four pages (P4 to P7) into the plurality of memory cells connected to the word line WL1 in the QLC block #1 is executed. The foggy-fine write operation for pages P4 to P7 is thereby finished. As a result, the data corresponding to the pages P4 to P7 can be read correctly from the QLC block #1.

(8) Next, write data of next four pages (P20 to P23) is transferred to the NAND flash memory 5 in a page unit and the foggy write operation for writing the write data of the four pages (P20 to P23) into a plurality of memory cells connected to a word line WL5 in the QLC block #1 is executed.

(9) When the foggy write operation to the plurality of memory cells connected to the word line WL5 is finished, a write target word line returns to the word line WL2 such that the fine write operation to the plurality of memory cells connected to the word line WL2 can be executed. Then, the same write data of four pages (P8 to P11) as the write data of the four pages (P8 to P11) used in the foggy write operation to the word line WL2 is transferred again to the NAND flash memory 5 in a page unit and the fine write operation for writing the write data of the four pages (P8 to P11) into the plurality of memory cells connected to the word line WL2 in the QLC block #1 is executed. The foggy-fine write operation for pages P8 to P11 is thereby finished. As a result, the data corresponding to the pages P8 to P11 can be read correctly from the QLC block #1.

FIG. 9 is a diagram illustrating an operation of controlling the zones and the shared QLC buffer 201, which is executed in the SSD 3.

In the SSD 3, the controller 4 writes all the write data received from the write buffer 51 of the host 2 into the only QLC block #1 (or QLC block #2) via the internal buffer 161 and does not write all the write data into the shared QLC buffer 201 until the controller 4 receives from the host 2 the close request for causing the zone #1 (or zone #2) to transition to the closed state.

In the case where writing the data into each of the QLC block #1 and the QLC block #2 is executed by the foggy-fine write operation, when both of two write operations (foggy write operation and fine write operation) for writing the write data into a plurality of memory cells connected to a certain word line are finished, the controller 4 transmits to the host 2 a response indicative of the completion (Completion) of each write request corresponding to the write data. That is, when the data written into the QLC block #1 (or QLC block #2) become readable from the QLC block #1 (or QLC block #2), the controller 4 transmits to the host 2 the response indicative of the completion (Completion) of each write request corresponding to the data.

When receiving the close request for causing the QLC block #1 (or QLC block #2) to transition to the closed state in which writing is suspended, the controller 4 transfers the remaining write data un-transferred to the internal buffer 161, from the write buffer 51 of the host 2 to the internal buffer 161.

For example, when the close request for specifying the zone #1 is received from the host 2, the controller 4 transfers the remaining write data of the write data associated with one or more received write requests for specifying the zone #1, from the write buffer 51 of the host 2 to the internal buffer 161. The remaining write data is data un-transferred to the internal buffer 161. For example, when the received write requests for specifying the zone #1 are write requests W1 to W5 and when write data associated with the write request W4 and write data associated with the write request W5 are not transferred to the internal buffer 161, both the write data associated with the write request W4 and the write data associated with the write request W5 are transferred as the remaining write data, from the write buffer 51 of the host 2 to the internal buffer 161.

Then, the controller 4 writes the remaining write data transferred to the internal buffer 161 not into the QLC block #1, but into the shared QLC buffer 201 alone. When the remaining write data are written into the shared QLC buffer 201, the controller 4 causes the state of the zone #1 to transition from the open state to the closed state. Furthermore, the controller 4 transmits to the host 2 a response indicative of completion of each of the write requests corresponding to the remaining write data and a response indicative of completion of the closed request.

In response to receiving the response indicative of the completion of each write request, the host 2 becomes capable of releasing the area in the write buffer 51 where the write data corresponding to each write request is stored and can reuse this area as, for example, an area for a zone to be newly opened.

When receiving from the host 2 the write request for rewriting the data into the zone #1 which is in the closed state, the controller 4 re-opens the zone #1 (QLC block #1). Then, the controller 4 reads the above-described remaining write data stored in the shared QLC buffer 201, from the shared QLC buffer 201, and transfers the remaining write data to the internal buffer 161. The remaining write data transferred from the shared QLC buffer 201 to the internal buffer 161 are written into the QLC block #1 at the timing at which the write data become writable into the QLC block #1.

The shared QLC buffer 201 may be implemented as a dynamic QLC buffer. The dynamic QLC buffer is a non-volatile buffer which is implemented by not using several QLC blocks dedicated to the shared QLC buffer 201, but dynamically allocating the QLC block for the shared QLC buffer 201 from the QLC blocks in the QLC region 202 which can be allocated to the zones.

As described above, after the zone in the closed state is reopened, the data stored in the shared QLC buffer 201 are written into the reopened QLC block. In addition, as illustrated in FIG. 5, the write data corresponding to the zone caused to transition to the second mode is copied from the shared QLC buffer 201 to the QLC block newly allocated to the zone. Therefore, the QLC block in the shared QLC buffer 201 where the only invalid data are stored by writing (or copying) the data to the reopened QLC block is released as a free block. This free block is returned to the QLC region 202.

Figure 10:
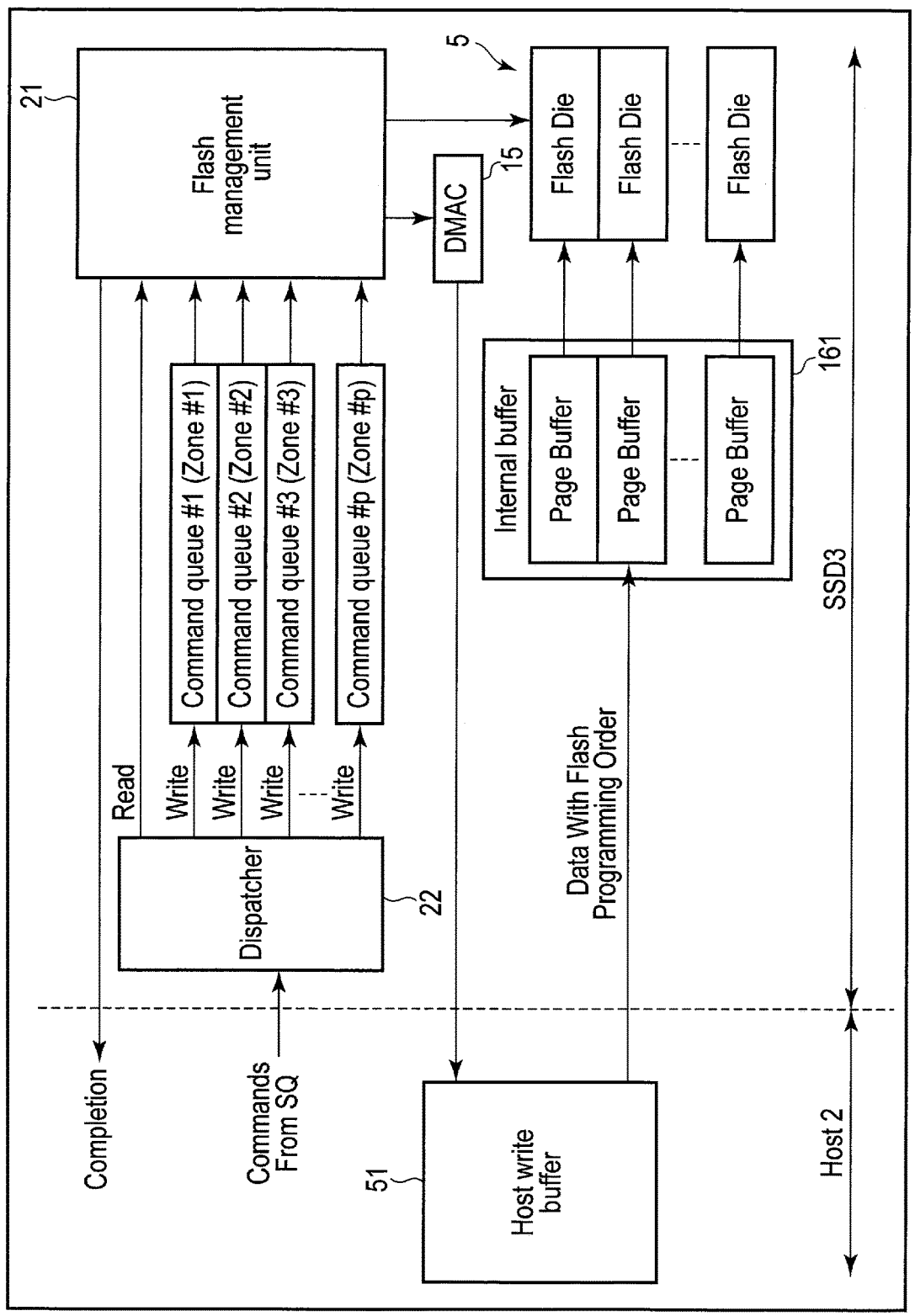
FIG. 10 is a block diagram illustrating a write operation executed in the memory system according to the embodiment.

FIG. 10 is a block diagram illustrating the write operation executed in the SSD 3.

In the controller 4 of the SSD 3, a plurality of command queues that correspond to the plurality of opened zones, respectively, are managed. Command queue #1 is used to store each of one or more write requests for specifying the zone #1. Command queue #2 is used to store each of one or more write requests for specifying the zone #2. Command queue #3 is used to store each of one or more write requests for specifying the zone #3. Command queue #p is used to store each of one or more write requests for specifying the zone #p.

Each of the commands (requests) stored in the submission queue (SQ) of the host 2 is fetched by the dispatcher 22. Then, each write request for specifying the zone #1 is stored in the command queue #1 by the command dispatcher 22, each write request for specifying the zone #2 is stored in the command queue #2 by the command dispatcher 22, each write request for specifying the zone #3 is stored in the command queue #3 by the command dispatcher 22, and each write request for specifying the zone #p is stored in the command queue #p by the command dispatcher 22.

As regards each of the command queues, the total size of the write data associated with a set of the stored write requests is checked by the flash management unit 21. Then, when the total size of the write data associated with a set of the write requests stored in a certain command queue reaches a threshold value, for example, the minimum write size of each QLC block, the write data having the minimum write size is transferred from the write buffer 51 of the host 2 to the internal buffer 161 by the DMAC 15 under control of the flash management unit 21.

Thus, since it is possible to suppress the internal buffer 161 being occupied by a plurality of write data each having smaller than the minimum write size, of which writing into the QLC block cannot be started, the necessary capacity of the internal buffer 161 can be reduced.

In addition, the transfer of the write data from the write buffer 51 of the host 2 to the internal buffer 161 is not executed in the order in which the write requests are fetched, but executed in the same order as the order in which the write data are written into each zone. For example, when 4-page write data corresponding to pages #0 to #3 of the QLC block #1 allocated to the zone #1 are to be transferred from the write buffer 51 of the host 2 to the internal buffer 161, the flash management unit 21 transfers four 16 KB write data to be written to the pages #0 to #3, respectively, in the order of the 16 KB write data to be written to the page #0, the 16 KB write data to be written to the page #1, the 16 KB write data to be written to the page #2, and the 16 KB write data to be written to the page #3, in page units, from the write buffer 51 of the host 2 to the internal buffer 161.

FIG. 11 is a block diagram illustrating a sequence of the write operation and a sequence of the read operation, which are executed in the SSD 3.

The controller 4 of the SSD 3 is configured to manage mapping between each of a plurality of QLC blocks (a plurality of physical blocks or a plurality of super blocks) included in the QLC region 202 and each of a plurality of zones, and can allocate a certain QLC block as one zone.

One QLC block corresponding to a certain zone is accessed by using contiguous logical addresses included in the LBA range assigned to this zone. Writing within one zone is basically executed sequentially. The zone to which the QLC block is assigned is hereinafter referred to as a QLC zone.

The states of each QLC zone are roughly classified into the open state (open zone), closed state (closed zone), full state (full zone), and empty state (empty zone).

The QLC zone in the open state is a zone allocated as a write destination zone where data is writable. The QLC block corresponding to the QLC zone in the open state is allocated as a write destination block. The flash management unit 21 manages each QLC zone in the open state, i.e., the QLC block corresponding to each QLC zone in the open state, by using an open zone list 101.

The QLC zone in the closed state is a zone where writing is suspended. The QLC block corresponding to the QLC zone where writing is suspended is a QLC block where data is partially written, i.e., a partially written QLC block. In the QLC block corresponding to the QLC zone in the closed state, several pages available for data write remain. The flash management unit 21 manages each QLC zone in the closed state, i.e., the QLC block corresponding to each QLC zone in the closed state, by using a closed zone list 102.

The QLC zone in the full state is a zone fully filled with data. The QLC block corresponding to the QLC zone in the full state is a block in which writing to all pages is completed. The flash management unit 21 manages each QLC zone in the full state, i.e., the QLC block corresponding to each QLC zone in the full state, by using a full zone list 103.

The QLC zone in the empty state is a reset zone. The QLC block corresponding to the QLC zone in the empty state is a free QLC block where no valid data are stored. The flash management unit 21 manages each QLC zone in the empty state, i.e., the QLC block corresponding to each QLC zone in the empty state, by using an empty zone list 104.

When the host 2 wishes to write data into a QLC zone in an empty state, the host 2 transmits to the SSD 3 an open request specifying a logical address indicative of the QLC zone in the empty state. In response to the reception of this open request from the host 2, the flash management unit 21 executes the erase operation for the QLC block allocated to this QLC zone, and thereby causes the state of this QLC zone to transition from the empty state to the open state.

The host 2 can set a plurality of QLC zones to the open state by repeating the process of transmitting the open request to the SSD 3.

For example, when the flash management unit 21 receives from the host 2 write requests for writing data into the QLC zone #1 in the open state, the flash management unit 21 transfers the write data of the minimum write size of each QLC zone from the write buffer 51 of the host 2 to the internal buffer 161 by using the DMAC 15. Then, the flash management unit 21 does not write the write data transferred to the internal buffer 161 into the shared QLC buffer 201, but writes the write data into the QLC zone #1 alone.

In addition, when the flash management unit 21 receives from the host 2 write requests for writing the data into the QLC zone #2 in the open state, the flash management unit 21 transfers the write data of the minimum write size of each QLC zone from the write buffer 51 of the host 2 to the internal buffer 161 by using the DMAC 15. Then, the flash management unit 21 does not write the write data transferred to the internal buffer 161 into the shared QLC buffer 201, but writes the write data into the QLC zone #2 alone.

When writing the data into a QLC zone in the open state is not executed for a while, the host 2 transmits to the SSD 3 the close request for causing the QLC zone to transition to the closed state in order to enable the region in the write buffer 51 of the host 2 allocated for the QLC zone to be released.

For example, when receiving from the host 2 the close request for specifying the logical address indicative of QLC zone #1, a write request in which an operation of writing data into the QLC zone #1 (zone #1) still cannot be started may be stored in the above-described command queue #1 corresponding to the QLC zone #1. This is because the write data associated with the respective write requests may not be transferred from the write buffer 51 of the host 2 to the internal buffer 161 until a set of write requests corresponding to the write data of four pages to be written into the next write location of the QLC zone #1 is stored in the command queue #1.

The flash management unit 21 transfers the remaining write data un-transferred to the internal buffer 161, of the plurality of write data associated with the plurality of received write requests for specifying the QLC zone #1, from the write buffer 51 of the host 2 to the internal buffer 161, by using the DMAC 15. The flash management unit 21 does not write the remaining write data transferred to the internal buffer 161 into the QLC zone #1, but writes the write data into the shared QLC buffer 201.

When the write data which does not finish being written into the QLC zone #1, for example, the write data in which the only foggy write operation is finished and the fine write operation is not finished exists in the internal buffer 161, the flash management unit 21 also writes this write data into the shared QLC buffer 201 together with the remaining write data.

Then, the flash management unit 21 causes the QLC zone #1 to transition to the closed state. In this case, the flash management unit 21 removes the QLC zone #1 from the open zone list 101 and adds the QLC zone #1 to the closed zone list 102.

The shared QLC buffer 201 is implemented as a dynamic QLC buffer. When the QLC zone (QLC block) for which the first time or more have elapsed after the execution of the erase operation for the QLC block and in which the unwritten region having a size larger than or equal to the first size remains exists in the open zone list 101 or the closed zone list 102, the flash management unit 21 allocates this QLC block as the shared QLC buffer 201 (Mode Change).

More specifically, the flash management unit 21 changes a mode of controlling the QLC zone (QLC block) for which the first time or more have elapsed after the execution of the erase operation for this QLC block and in which the unwritten region having a size larger than or equal to the first size remains, from the first mode to the second mode, and allocates this QLC block as the write destination QLC block (Open QLC) of the shared QLC buffer 201. Every time the flash management unit 21 receives the close request, the flash management unit 21 writes the remaining write data to be written to the QLC zone to be closed, into the write destination QLC block (Open QLC) of the shared QLC buffer 201.

When the entire write destination QLC block of the shared QLC buffer 201 is filled with the data, the flash management unit 21 manages the write destination QLC block as the QLC block in the full state.

The flash management unit 21 may manage all the QLC blocks in the full state included in the shared QLC buffer 201 by using a first-in first-out (FIFO) list. The FIFO list includes a plurality of entries. When one QLC block in the full state is added to the FIFO list, each QLC block already stored in each entry of the FIFO list is moved by one entry toward the exit side of the FIFO list. The flash management unit 21 may select the QLC block (oldest QLC block) which reaches the exit of the FIFO list, as a copy source block for garbage collection (GC) of the shared QLC buffer 201. The flash management unit 21 determines whether or not the valid data is stored in the selected QLC block.

When no valid data is stored in the selected QLC block, the flash management unit 21 adds the selected QLC block to the empty zone list 104 for the QLC region 202 and thereby returns the selected QLC block to the QLC region 202 as the QLC block in the reset state.

When valid data is stored in the selected QLC block, the flash management unit 21 copies the valid data stored in the selected QLC block to the write destination QLC block (open QLC). Then, the flash management unit 21 updates the L2P table 31 and maps the physical address indicative of the storage location in the write destination QLC block to which the valid data is copied, to the logical address of the copied valid data. When copying all the valid data in the selected QLC block is completed, the flash management unit 21 adds the selected QLC block to the empty zone list 104 for the QLC region 202 and thereby returns the selected QLC block to the QLC region 202 as the QLC block in the reset state.

Every time a new write destination QLC block (Open QLC) needs to be allocated to the shared QLC buffer 201, the flash management unit 21 selects the QLC block for which the first time or more have elapsed after the execution of the erase operation and in which the unwritten region having a size larger than or equal to the first size remains, from the open zone list 101 or the closed zone list 102, and allocates this QLC block as a new write destination QLC block (Open QLC) of the shared QLC buffer 201.

Incidentally, when the QLC block for which the first time or more have elapsed after the execution of the erase operation and in which the unwritten region having a size larger than or equal to the first size remains does not exist in the open zone list 101 or the closed zone list 102, the flash management unit 21 allocates one QLC block of the set of the QLC blocks managed by the empty zone list 104 as the write destination QLC block (Open QLC) of the shared QLC buffer 201.

In addition, as regards each of the QLC zones in the open state, the closed state, or the full state, the flash management unit 21 manages (i) a readable area of this QLC zone and (ii) the storage location information indicative of each storage location where data unreadable from this QLC zone is stored, by using the zone management table 33.

Each storage location is either the storage location in the shared QLC buffer 201 or the storage location in the write buffer 51 of the host 2. For example, each storage location may be managed in units of a sector having a size of 4 KB.

When the flash management unit 21 receives from the host 2 a read command (read request) that specifies both the starting LBA indicative of the QLC zone and the offset within this QLC zone, and the data size of the read target data, the flash management unit 21 determines whether or not the LBA range corresponding to the read target data is included in the readable area of the QLC block (zone). The LBA range corresponding to the read target data is determined by the offset and the data size each specified by the read command.

When the LBA range corresponding to the read target data is included in the readable area of the QLC block (zone), the flash management unit 21 reads the read target data from the QLC block (zone) and transmits the read target data as the read hit data to the host 2 by using the DMAC 15.

When the LBA range corresponding to the read target data is not included in the readable area of the QLC block (zone), the flash management unit 21 reads the read target data from an SLC buffer 401 or the write buffer 51 of the host 2, based on the storage location information corresponding to the QLC zone, and transmits the read target data as the read hit data to the host 2 by using the DMAC 15.

The flash management unit 21 may execute the only process of notifying the host 2 that the read target data does not exist in the SSD 3, instead of reading the read target data from the write buffer 51 of the host 2. In this case, the flash management unit 21 may notify the host 2 of the location in the write buffer 51 of the host 2 where the read target data exists.

As regards the QLC zone in the full state filled with the data, the whole LBA range of this QLC zone is managed as the readable area.

When all the data stored in the QLC zone in the full state become unnecessary data that are not used, the host 2 can transmit to the SSD 3 a reset request that specifies the logical address indicative of this QLC zone. In response to receiving this reset request from the host 2, the flash management unit 21 causes the state of this QLC zone to transition to the empty state.

FIG. 12 is a flowchart illustrating a procedure of the zone open operation executed in the SSD 3.

An example of the operation of opening the QLC zone #1 and the QLC zone #2 will be described, but an operation of opening the other QLC zone is also executed in the same procedure as the operation of opening the QLC zone #1 and the QLC zone #2.

When the controller 4 of the SSD 3 receives the open request from the host 2 (YES in step S101), the controller 4 determines whether the received open request is the open request for causing the QLC zone #1 to transition to the open state or the open request for causing the QLC zone #2 to transition to the open state (steps S102 and S103).

When the received open request is an open request for causing the QLC zone #1 to transition to the open state (YES in step S102), the controller 4 sends, to the NAND flash memory die including the QLC block allocated to the QLC zone #1, an erase instruction that specifies the QLC block and thereby executes the erase operation for the QLC block (step S104). When the execution of the erase operation for this QLC block is completed, the controller 4 causes the state of the QLC zone #1 to transition from the empty state to the open state. The controller 4 records an erase time stamp indicative of the time (for example, year, month, day, hour, minute, and second) at which the erase operation of the QLC block is executed, in the erase time stamp management table 32 (step S105). Then, the controller 4 transmits a response indicative of completion of the open request to the host 2 (step S106).

When the received open request is the open request for causing the QLC zone #2 to transition to the open state (YES in step S103), the controller 4 sends, to the NAND flash memory die including the QLC block allocated to the QLC zone #2, an erase instruction that specifies the QLC block and thereby executes the erase operation for the QLC block (step S107). When the execution of the erase operation for this QLC block is completed, the controller 4 causes the state of the QLC zone #2 to transition from the empty state to the open state. The controller 4 records the erase time stamp indicative of the time (for example, year, month, day, hour, minute, and second) at which the erase operation of the QLC block is executed, in the erase time stamp management table 32 (step S108). Then, the controller 4 transmits a response indicative of completion of the open request to the host 2 (step S106).

FIG. 13 is a flowchart illustrating a procedure of the write operation executed in the SSD 3.

An example of writing the write data into the QLC zone #1 or the QLC zone #2 will be described, but an operation of writing the write data into the other QLC zone in the open state is also executed in the same procedure as the operation of writing the write data into the QLC zone #1 or the QLC zone #2.

During a period from the execution of the erase operation for the QLC block corresponding to each of the QLC zone #1 and the QLC zone #2 until the first time elapses, the controller 4 of the SSD 3 controls each of the QLC zone #1 and the QLC zone #2 in the first mode and executes the write operation described below for each of the QLC zone #1 and the QLC zone #2.

When the controller 4 of the SSD 3 receives the write request from the host 2 (YES in step S11), the controller 4 determines whether the received write request is the write request that specifies the QLC zone #1 or the write request that specifies the QLC zone #2 (steps S12 and S17).

When the received write request is the write request that specifies the QLC zone #1 (YES in step S12), the controller 4 stores the received write request in the command queue #1 corresponding to the QLC zone #1 and determines whether or not the transfer start condition of the write data to be written to the QLC zone #1 is satisfied (step S13).

In step S13, the controller 4 determines whether or not the total size of the write data associated with a set of the write requests stored in the command queue #1 reaches the minimum write size (for example, 4-page size) of the QLC block.

When the total size of the write data associated with a set of the write requests stored in the command queue #1 reaches the minimum write size of the QLC block, the controller 4 determines that the transfer start condition of the write data to be written to the QLC zone #1 is satisfied (YES in step S13).

In this case, the controller 4 transfers the write data associated with a set of the write requests stored in the command queue #1, from the write buffer 51 of the host 2 to the internal buffer 161 (step S14). The transferred write data have the minimum write size necessary for the write operation of the QLC zone #1.

The controller 4 writes the write data transferred to the internal buffer 161 into the QLC block #1 allocated to the QLC zone #1, by the foggy-fine write operation of writing the data of 4 bits per memory cell (step S15).

Thus, every time a set of the write requests for the minimum write size is accumulated in the command queue #1, the controller 4 executes the transfer of the write data from the write buffer 51 of the host 2 to the internal buffer 161 and the operation of writing the write data into the QLC block #1 allocated to the QLC zone #1. When the fine write operation of certain write data is finished such that the write data becomes readable from the QLC block #1, the controller 4 transmit to the host 2 a response indicative of the completion of the write request corresponding to the readable write data (step S16).

When the received write request is the write request that specifies the QLC zone #2 (YES in step S17), the controller 4 stores the received write request in the command queue #2 corresponding to the QLC zone #2 and determines whether or not the transfer start condition of the write data to be written to the QLC zone #2 is satisfied (step S18).

In step S18, the controller 4 determines whether or not the total size of the write data associated with a set of the write requests stored in the command queue #2 reaches the minimum write size (for example, 4-page size) of the QLC block.

When the total size of the write data associated with a set of the write requests stored in the command queue #2 reaches the minimum write size of the QLC block, the controller 4 determines that the transfer start condition of the write data to be written to the QLC zone #2 is satisfied (YES in step S18).

In this case, the controller 4 transfers the write data associated with a set of the write requests stored in the command queue #2, from the write buffer 51 of the host 2 to the internal buffer 161 (step S19). The transferred write data have the minimum write size necessary for the write operation of the QLC zone #2.

The controller 4 writes the write data transferred to the internal buffer 161 into the QLC block #2 allocated to the QLC block #2, by the foggy-fine write operation of writing the data of 4 bits per memory cell (step S20).

Thus, every time a set of the write requests for the minimum write size is accumulated in the command queue #2, the controller 4 executes the transfer of the write data from the write buffer 51 of the host 2 to the internal buffer 161 and the operation of writing the write data into the QLC block #2 allocated to the QLC zone #2. When the fine write operation of certain write data is finished such that the write data becomes readable from the QLC block #2, the controller 4 transmits to the host 2 a response indicative of the completion of the write request corresponding to the readable write data (step S16).

Figure 14:
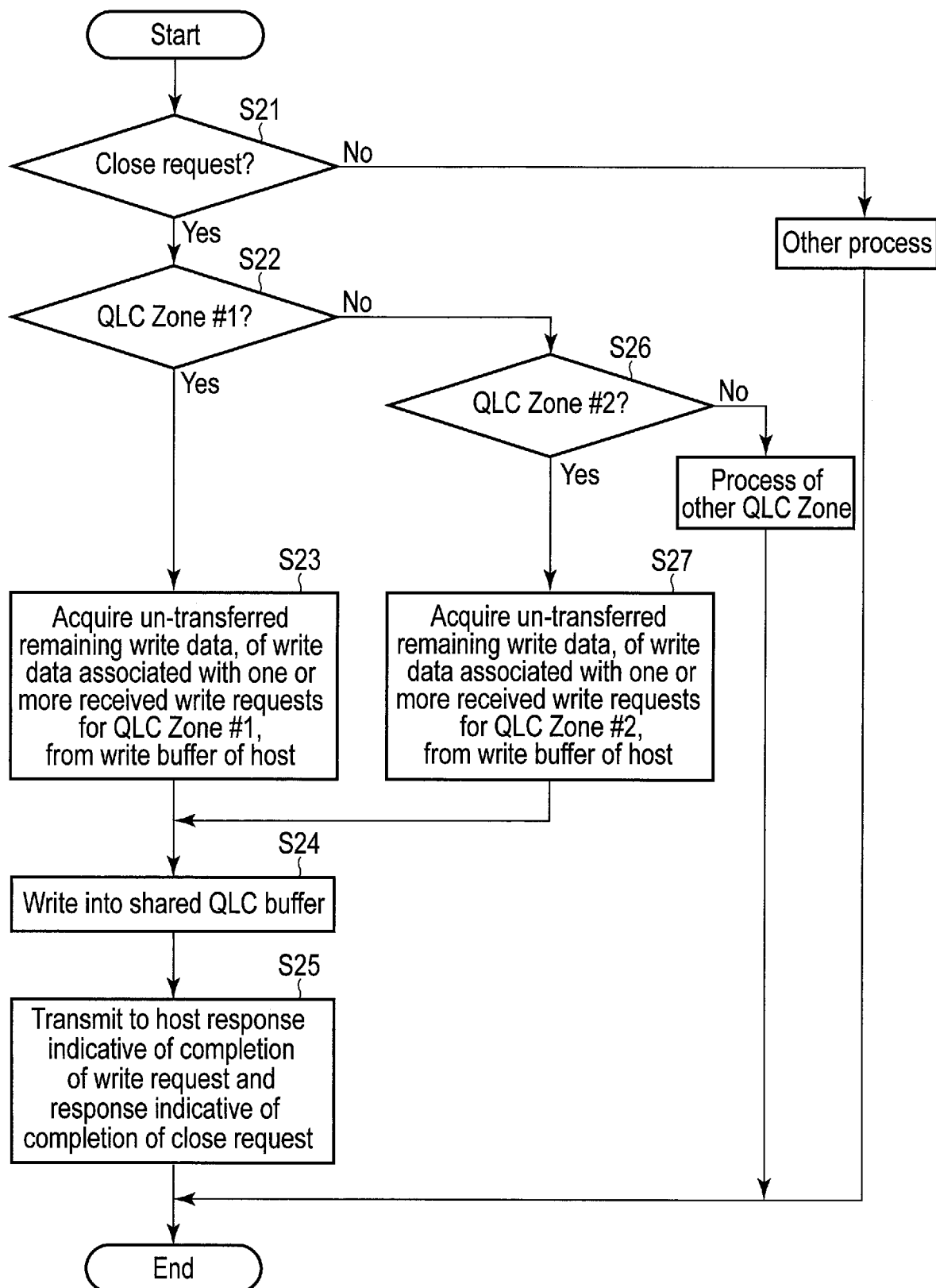
FIG. 14 is a flowchart illustrating a procedure of a zone close operation executed in the memory system according to the embodiment.

FIG. 14 is a flowchart illustrating a procedure of the zone close operation executed in the SSD 3.

An example of causing the QLC zone #1 and the QLC zone #2 to transition to the closed state will be described, but an operation of causing the other QLC zone in the open state to transition to the closed state is also executed in the same procedure as the operation of causing the QLC zone #1 and the QLC zone #2 to transition to the closed state.

When receiving the close request from the host 2 (YES in step S21), the controller 4 determines whether the QLC zone specified by the received close request is the QLC zone #1 or the QLC zone #2 (steps S22 and S26). When the QLC zone specified by the received close requests is the QLC zone #1 (YES in step S22), the controller 4 acquires the remaining write data of the write data associated with one or more received write requests for specifying the QLC zone #1, from the write buffer 51 of the host 2 (step S23). The remaining write data is write data un-transferred to the internal buffer 161.

The controller 4 writes the remaining write data acquired from the write buffer 51 of the host 2 into the write destination QLC block of the shared QLC buffer 201 by, for example, the foggy-fine write operation (step S24). In step S24, the controller 4 acquires from the internal buffer 161 the first write data that is still not readable from the QLC block #1 corresponding to the QLC zone #1 (i.e., the write data for which the only foggy write operation is finished and the fine write operation is still not executed), and writes the remaining write data corresponding to the QLC zone #1 acquired from the write buffer 51 of the host 2 into the write destination QLC block of the shared QLC buffer 201 together with the first write data. Thus, the write data for which the only foggy write operation is finished and the fine write operation is still not executed can also be persistently stored by using the shared QLC buffer 201.

The controller 4 transmits to the host 2 a response indicative of the completion of each of the write requests corresponding to the write data readable from the shared QLC buffer 201 and a response indicative of the completion of the close request (step S25).

When the QLC zone specified by the close requests is the QLC zone #2 (YES in step S26), the controller 4 acquires the remaining write data of the write data associated with one or more received write requests for specifying the QLC zone #2, from the write buffer 51 of the host 2 (step S27). The remaining write data is write data un-transferred to the internal buffer 161. Then, the controller 4 executes the above-described processes in steps S24 and S25.

Figure 15:
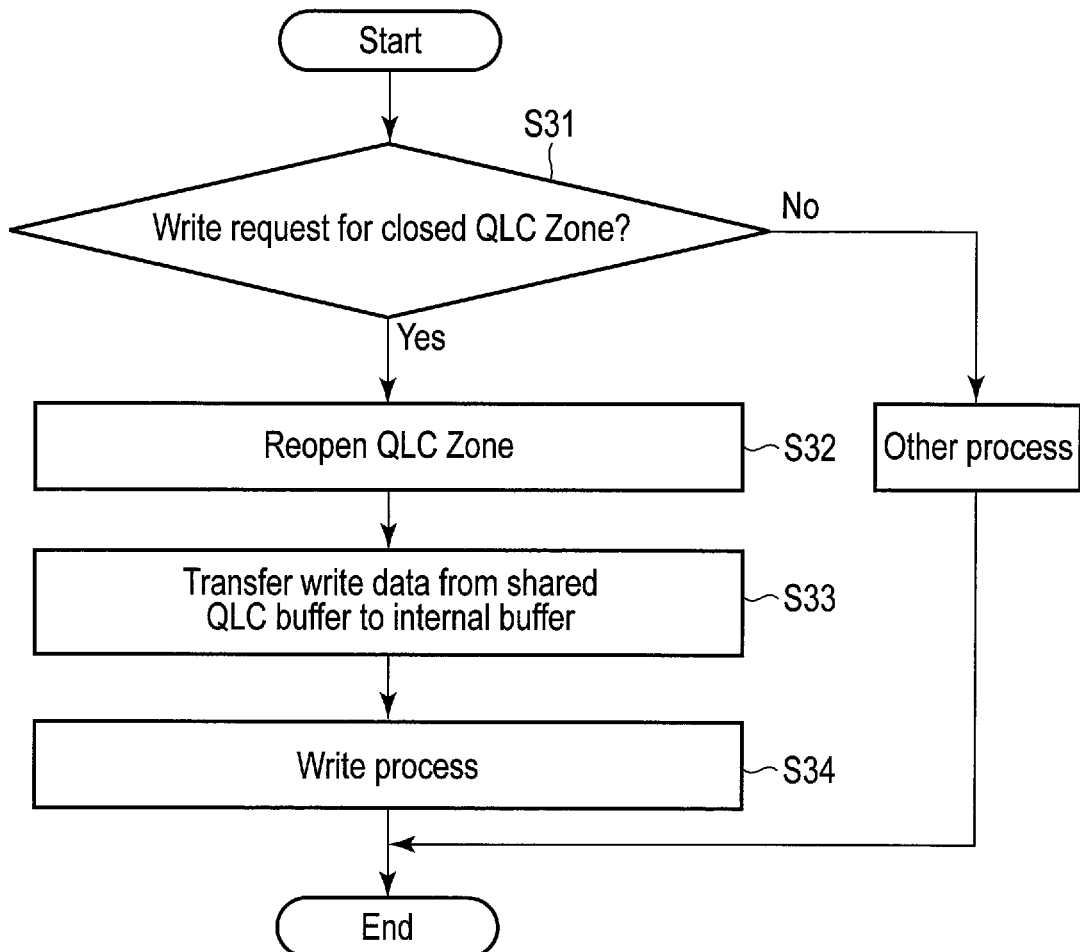
FIG. 15 is a flowchart illustrating a procedure of an operation of reopening a zone, which is executed in the memory system according to the embodiment.

FIG. 15 is a flowchart illustrating a procedure of an operation of reopening a QLC zone in the closed state, which is executed in the SSD 3 in response to receiving the write request that specifies the QLC zone in the closed state.

When receiving from the host 2 the write request that specifies the QLC zone in the closed state (YES in step S31), the controller 4 re-opens this QLC zone and causes the state of this QLC zone to transition from the closed state to the open state (step S32).

Then, the controller 4 transfers the write data for the QLC zone stored in the shared QLC buffer 201, from the shared QLC buffer 201 to the internal buffer 161 (step S33), and executes a write process of writing into this QLC zone the write data transferred from the shared QLC buffer 201 to the internal buffer 161 and write data for this QLC zone newly transferred from the write buffer 51 of the host 2 (step S34).

Figure 16:
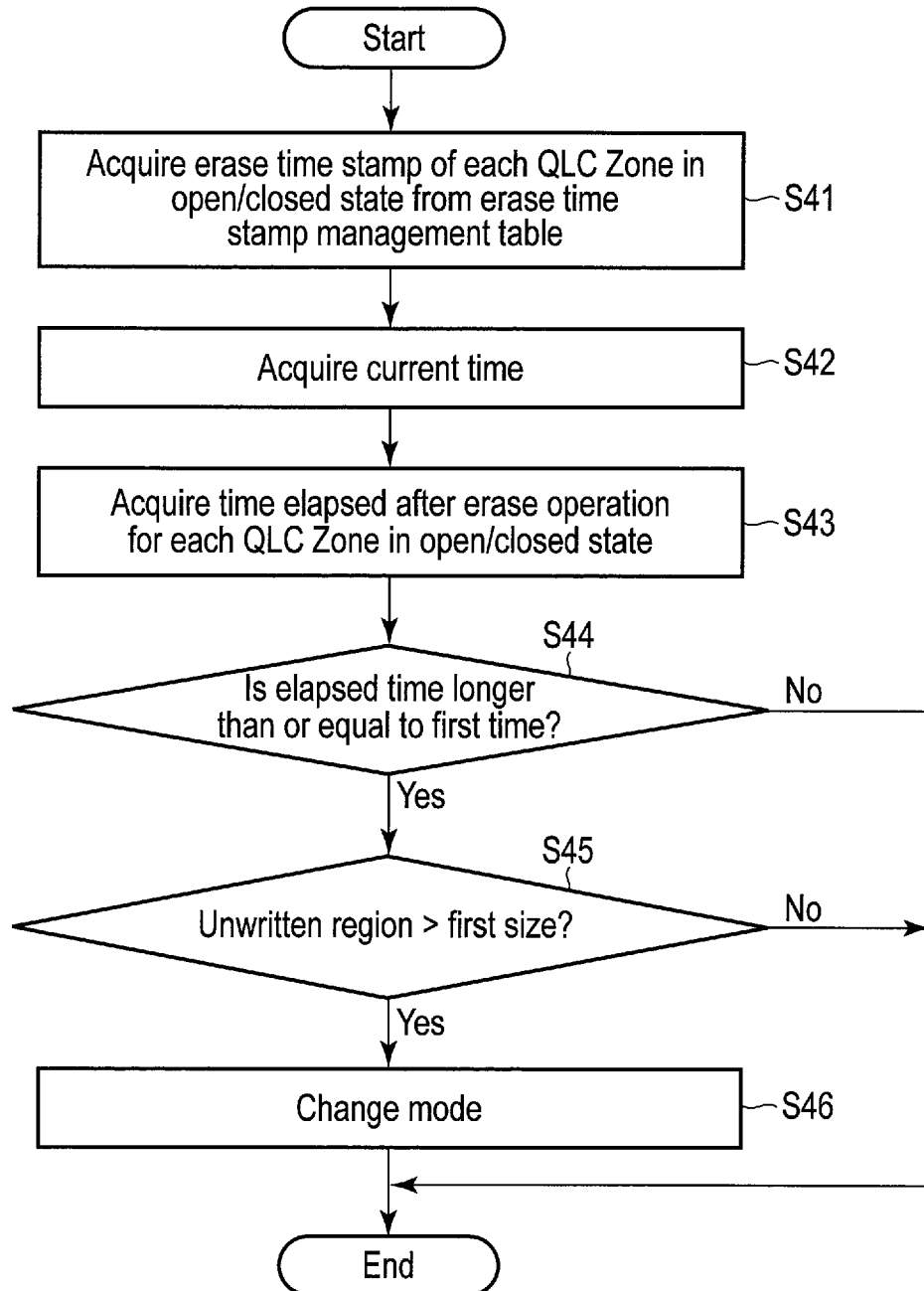
FIG. 16 is a flowchart illustrating a procedure of a mode change operation executed in the memory system according to the embodiment.

FIG. 16 is a flowchart illustrating a procedure of the mode change operation executed in the SSD 3. For example, the following mode change operation may be repeated at predetermined time intervals.

First, the controller 4 acquires the erase time stamp of each QLC zone in the open state or the closed state from the erase time stamp management table 32 (step S41). Next, the controller 4 acquires the current time (step S42). The controller 4 may include a clock module which counts the time. In this case, the controller 4 may acquire the current time from the clock module in the controller 4.

As regards each QLC zone in the open state or the closed state, the controller 4 obtains an elapsed time from the execution of the erase operation to the current time, by subtracting the value of the erase time stamp from the current time (step S43).

As regards each QLC zone in the open state or the closed state, the controller 4 determines whether or not the elapsed time is longer than or equal to the first time (step S44). When the elapsed time from the execution of the erase operation of a certain QLC zone to the current time is longer than or equal to the first time (YES in step S44), the controller 4 determines whether or not an unwritten region having a size larger than or equal to the first size remains in the QLC block corresponding to this QLC zone (step S45).

When an unwritten region having a size larger than or equal to the first size remains in the QLC block (YES in step S45), the controller 4 presumes there is high possibility that this QLC block may not become the full state even when a write limit time (second time) has elapsed after the execution of the erase operation of the QLC block. Then, the controller 4 changes the mode of controlling the writing into this QLC block from the above-described first mode to the above-described second mode and allocates this QLC block as the write destination QLC block of the shared QLC buffer 201 (step S46).

FIG. 17 is a flowchart illustrating a procedure of the zone close operation executed in the second mode.

It is assumed in the following descriptions that the mode of controlling the QLC block #1 allocated to the QLC zone #1 is changed from the first mode to the second mode and the QLC block #1 is allocated as the shared QLC buffer 201.

When the controller 4 receives the close request that specifies the QLC zone #1 or one of the other zones from the host (YES in step S201), the controller 4 acquires the remaining write data un-transferred to the internal buffer 161, of the write data associated with one or more received write requests for specifying the QLC zone (QLC zone #1 or one of the other zones) specified by the received close request, from the write buffer 51 of the host 2 (step S202).

The controller 4 writes the acquired write data into the unwritten region of the QLC block #1 allocated as the shared QLC buffer 201 (step S203).

The controller 4 determines whether or not the entire QLC block #1 becomes the full state of being filled with the data (step S204). When the QLC block #1 becomes the full state (YES in step S204), the controller 4 adds the QLC block #1 to the FIFO list of the shared QLC buffer 201 (step S205).

When the QLC block #1 is not the full state (NO in step S204), the controller 4 determines whether or not a time elapsed after the execution of the erase operation of the QLC block #1 reaches the write limit time (second time) (step S206).

When the time elapsed after the execution of the erase operation of the QLC block #1 reaches the write limit time (second time) (YES in step S206), the controller 4 sets the QLC block #1 to the full state by writing the dummy data generated by the controller 4 into the unwritten region of the QLC block #1 (step S207) and adds the QLC block #1 in the full state to the FIFO list of the shared QLC buffer 201 (step S205).

In contrast, when the time elapsed after the execution of the erase operation of the QLC block #1 does not reach the write limit time (second time) (NO in step S206), the controller 4 proceeds to the process of step S201 and continuously uses the QLC block #1 as the write destination QLC block of the shared QLC buffer 201.

FIG. 18 is a flowchart illustrating a procedure of a copy operation executed in the second mode.

It is assumed that the mode of controlling the QLC block #1 allocated to the QLC zone #1 is changed from the first mode to the second mode and the QLC block #1 is allocated as the shared QLC buffer 201.

The controller 4 receives from the host 2 each of subsequent write requests for specifying the QLC zone #1 and stores the received subsequent write requests into the command buffer corresponding to the QLC zone #1 (step S51).

Then, the controller 4 determines whether or not the write start condition corresponding to the second mode on the QLC block #1 is satisfied or not (step S52). The write start condition corresponding to the second mode on the QLC block #1 is satisfied when the data size of the write data corresponding to the QLC zone #1 stored in the shared QLC buffer 201 reaches the capacity for one zone or when the total of both the data size of the write data corresponding to the QLC zone #1 stored in the shared QLC buffer 201 and the data size of the subsequent write data corresponding to the QLC zone #1 stored in the write buffer 51 of the host 2 reaches the capacity for one zone.

The controller 4 waits while repeating the process of step S51, until the write start condition corresponding to the second mode is satisfied. When receiving from the host 2 the close request for specifying the QLC zone #1 before the write start condition corresponding to the second mode is satisfied, the controller 4 executes the zone close operation illustrated in FIG. 17.

Therefore, the data size of the write data corresponding to the zone #1 stored in the shared QLC buffer 201 is increased by the close request for specifying the QLC zone #1. In addition, even when the close request for specifying the QLC zone #1 is not received, the data size of the subsequent write data corresponding to the zone #1 stored in the write buffer 51 of the host 2 is increased by the subsequent write request for specifying the zone #1. Therefore, the write start condition corresponding to the second mode on the QLC block #1 is satisfied at some time.

When the write start condition corresponding to the second mode on the QLC block #1 is satisfied (YES in step S52), i.e., when the data size of the write data corresponding to the QLC zone #1 stored in the shared QLC buffer 201 (or the shared QLC buffer 201 and the write buffer 51 of the host 2) reaches the capacity for one zone, the controller 4 allocates one QLC block (in this example, QLC block #x) of the set of the QLC blocks managed by the empty zone list 104 to the QLC zone #1 (step S53). The controller 4 executes the erase operation for QLC block #x (step S54). Then, the controller 4 copies the write data corresponding to the QLC zone #1 from the shared QLC buffer 201 (or both the shared QLC buffer 201 and the write buffer 51 of the host 2) to the QLC block #x (step S55). In step S55, the controller 4 reads the write data corresponding to the QLC zone #1 from the shared QLC buffer 201 (or both the shared QLC buffer 201 and the write buffer 51 of the host 2) and writes the write data into the QLC block #x. The QLC block #x newly allocated to the QLC zone #1 thereby becomes the full state.

As described above, according to the present embodiment, the controller 4 executes a first write operation including both the operation of transferring the write data associated with a set of one or more write requests from the host 2 for specifying the QLC zone #1, from the write buffer 51 of the host 2 to the internal buffer 161, and the operation of writing the write data transferred to the internal buffer 161 into the QLC block #1, during a period from the execution of the erase operation for the QLC block #1 allocated to the QLC zone #1 until the first time elapses (first mode). When the first time has elapsed after the execution of the erase operation for the QLC block #1, in a state in which an unwritten region having a size larger than or equal to a first size remains in the for the QLC block #1, the controller 4 does not execute the first write operation, but allocates the QLC block #1 as the shared QLC buffer 201. The controller 4 can thereby start using the QLC block #1 not as the storage region dedicated to the QLC zone #1, but as the shared QLC buffer 201 that is a storage region common to all of the QLC zones. For this reason, the time required until the QLC block #1 becomes the full state can be reduced as compared with a case of continuing using the QLC block #1 as the storage region dedicated to the QLC zone #1. Therefore, even when the speed of writing into the QLC zone #1 by the host 2 is slow, the QLC block #1 can be caused to transition to the full state within a write limit time, by using the write data corresponding to various other zones, at a high possibility.

As a result, the amount of the data (dummy data) other than the user data, written into the QLC block corresponding to each QLC zone in which the speed of writing by the host 2 is slow can be reduced, and the efficiency of use of the storage regions in the NAND flash memory 5 can be improved.

In addition, according to the configuration of the present embodiment, restrictions on the host 2 side to cause each opened QLC zone to transition to the full state within the limit time can be actually eliminated and the convenience on the host 2 side can be improved. Incidentally, the write buffer 51 of the host 2 may be implemented by a nonvolatile write buffer. The nonvolatile write buffer may be implemented by a nonvolatile memory such as a storage class memory (SCM).

When the write buffer 51 of the host 2 is implemented by the nonvolatile write buffer, and even when the data in the internal buffer 161 are lost by power loss such as power failure, the data can be acquired again from the nonvolatile write buffer of the host 2. Therefore, even when the SSD 3 does not comprise a capacitor for executing a power loss protection function, it is possible to prevent the data in the internal buffer 161 from being lost due to power loss.

In addition, the shared QLC buffer 201 may be implemented by a nonvolatile memory such as a storage class memory (SCM) or an SLC buffer including several single-level cell (SLC) blocks.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A memory system connectable to a host, comprising:
a nonvolatile memory; and
a controller electrically connected to the nonvolatile memory and configured to allocate one storage region of a plurality of storage regions included in the nonvolatile memory to each of a plurality of zones to which a plurality of logical address ranges obtained by dividing a logical address space for accessing the memory system are allocated, respectively, wherein
the controller is configured to:
execute an erase operation for a first storage region allocated to a first zone of the plurality of zones;
during a period from the execution of the erase operation for the first storage region until a first time elapses, in response to receiving one or more write requests for specifying the first zone from the host, execute a first write operation including an operation of transferring write data associated with a set of the one or more write requests from a write buffer of the host to an internal buffer of the memory system, and an operation of writing the write data transferred to the internal buffer into the first storage region;
when the first time has elapsed after the execution of the erase operation, in a state in which an unwritten region having a size larger than or equal to a first size remains in the first storage region, not execute the first write operation, allocate the first storage region as a nonvolatile buffer capable of temporarily storing write data to be written to each of the plurality of zones; and
in response to receiving from the host a first request for causing a state of the first zone or another zone to transition to a state in which writing is suspended, acquire remaining write data of write data associated with one or more received write requests for specifying the first zone or the other zone, from the write buffer of the host, the remaining write data being write data un-transferred to the internal buffer, and write the acquired remaining write data into the unwritten region of the first storage region allocated as the nonvolatile buffer.

2. The memory system of claim 1, wherein
the controller is configured to, when a data size of write data corresponding to the first zone stored in the nonvolatile buffer reaches a capacity for one zone or when a total of the data size of the write data corresponding to the first zone stored in the nonvolatile buffer and a data size of subsequent write data corresponding to the first zone stored in the write buffer of the host reaches the capacity for one zone, copy the write data corresponding to the first zone or both the write data corresponding to the first zone and the subsequent write data corresponding to the first zone stored in the write buffer of the host, from the nonvolatile buffer or from both the nonvolatile buffer and the write buffer of the host to a second storage region newly allocated to the first zone.

3. The memory system of claim 1, wherein
the controller is configured to contiguously execute the first write operation when the first time has elapsed after the execution of the erase operation, in a state in which the unwritten region having the size larger than or equal to the first size does not remain in the first storage region.

4. The memory system of claim 1, wherein
the controller is configured to:
when a second time longer than the first time has elapsed after the execution of the erase operation for the first storage region, determine whether or not the entire first storage region is filled with data; and
when the entire first storage region is not filled with data, set the first storage region to a state in which the entire first storage region is filled with data, by writing dummy data generated by the controller into an unwritten region of the first storage region.

5. The memory system of claim 1, wherein
the controller is configured to:
manage a set of storage regions where valid data are not stored, of the plurality of storage regions; and
when a storage region in which the first time or more have elapsed after execution of an erase operation for the storage region and an unwritten region having a size larger than or equal to the first size remains does not exist, allocate one storage region in the set of the storage regions where the valid data are not stored, as the nonvolatile buffer.

6. The memory system of claim 1, wherein
the controller is configured to change a length of the first time for each of the storage regions, on the basis of a degree of wear of each of the plurality of storage regions.

7. The memory system of claim 1, wherein
the controller is configured to, when a data size of write data associated with a set of one or more received write requests for specifying the first zone reaches the minimum write size of each of the plurality of zones, transfer the write data associated with the set of one or more received write requests, having the minimum write size, from the write buffer of the host to the internal buffer.

8. A control method of controlling a memory system including a nonvolatile memory, the method comprising:
allocating one storage region of a plurality of storage regions included in the nonvolatile memory to each of zones to which a plurality of logical address ranges obtained by dividing a logical address space for accessing the memory system are allocated, respectively;
executing an erase operation of a first storage region allocated to a first zone of the plurality of zones;
during a period from the execution of the erase operation of the first storage region until a first time elapses, in response to receiving one or more write requests for specifying the first zone from a host, executing a first write operation including an operation of transferring write data associated with the set of one or more write requests from a write buffer of the host to an internal buffer of the memory system, and an operation of writing the write data transferred to the internal buffer into the first storage region;

when the first time has elapsed after the execution of the erase operation, in a state in which an unwritten region having a size larger than or equal to a first size remains in the first storage region, not executing the first write operation, allocating the first storage region as a nonvolatile buffer capable of temporarily storing write data to be written to each of the plurality of zones; and in response to receiving from the host a first request for causing a state of the first zone or another zone to transition to a state in which writing is suspended, acquiring remaining write data of write data associated with one or more received write requests for specifying the first zone or the other zone, from the write buffer of the host, the remaining write data being write data un-transferred to the internal buffer, and writing the acquired remaining write data into the unwritten region of the first storage region allocated as the nonvolatile buffer.

9. The control method of claim 8, further comprising:
when a data size of write data corresponding to the first zone stored in the nonvolatile buffer reaches a capacity for one zone or when a total of the data size of the write data corresponding to the first zone stored in the nonvolatile buffer and a data size of subsequent write data corresponding to the first zone stored in the write buffer of the host reaches the capacity for one zone, copying the write data corresponding to the first zone or both the write data corresponding to the first zone and the subsequent write data corresponding to the first zone stored in the write buffer of the host, from the nonvolatile buffer or from both the nonvolatile buffer and the write buffer of the host to a second storage region newly allocated to the first zone.

10. The control method of claim 8, further comprising:
when the first time has elapsed after the execution of the erase operation, in a state in which an unwritten region having a size larger than or equal to the first size does not remain in the first storage region, contiguously executing the first write operation.

11. The control method of claim 8, further comprising:
when a second time longer than the first time has elapsed after the execution of the erase operation from the first storage region, determining whether or not the entire first storage region is filled with data; and when the entire first storage region is not filled with data, setting the first storage region to a state in which the entire first storage region is filled with data, by writing dummy data into the unwritten region of the first storage region.

12. The control method of claim 8, wherein
when a data size of write data associated with a set of one or more received write requests for specifying the first zone reaches the minimum write size of each of the plurality of zones, the first write operation includes transferring the write data associated with the set of one or more received write requests, having the minimum write size, from the write buffer of the host to the internal buffer.

* * * * *